(12) United States Patent
Nitta

(10) Patent No.: US 9,340,011 B2
(45) Date of Patent: May 17, 2016

(54) APPARATUS AND METHOD FOR DRIVING CAPACITANCE-TYPE ACTUATOR

(75) Inventor: Noboru Nitta, Tagata-gun (JP)

(73) Assignee: Toshiba Tec Kabushiki Kaisha, Tokyo (JP)

(*) Notice: Subject to any disclaimer, the term of this patent is extended or adjusted under 35 U.S.C. 154(b) by 988 days.

(21) Appl. No.: 13/218,290

(22) Filed: Aug. 25, 2011

(65) Prior Publication Data

US 2012/0146451 A1    Jun. 14, 2012

(30) Foreign Application Priority Data

Dec. 8, 2010   (JP) ................................ 2010-273249

(51) Int. Cl.
*B41J 2/045*       (2006.01)
*H02M 3/07*        (2006.01)

(52) U.S. Cl.
CPC ............ *B41J 2/04548* (2013.01); *B41J 2/0455* (2013.01); *B41J 2/04541* (2013.01); *B41J 2/04573* (2013.01); *B41J 2/04581* (2013.01); *H02M 3/07* (2013.01)

(58) Field of Classification Search
CPC .... B41J 2/04541; B41J 2/4548; B41J 2/4581; B41J 2/4573
USPC .......................................................... 310/300
See application file for complete search history.

(56) References Cited

U.S. PATENT DOCUMENTS

| | | | |
|---|---|---|---|
| 5,936,644 A | 8/1999 | Ono et al. | |
| 6,046,613 A | * 4/2000 | Tamura | ........................ 327/108 |
| 6,113,209 A | 9/2000 | Nitta et al. | |
| 6,504,701 B1 | 1/2003 | Takamura et al. | |
| 6,841,920 B2 | 1/2005 | Takamura et al. | |
| 2007/0076026 A1 | 4/2007 | Nakayama | |
| 2009/0189957 A1 | 7/2009 | Kitazawa et al. | |
| 2010/0007704 A1 | 1/2010 | Nitta | |

FOREIGN PATENT DOCUMENTS

| | | |
|---|---|---|
| CN | 101689818 | 3/2010 |
| EP | 0909032 | 4/1999 |
| JP | 09-065646 | 3/1997 |

(Continued)

OTHER PUBLICATIONS

Office Action dated Jan. 21, 2014, filed in corresponding Japanese Patent Application No. 2010-273249 (with English Translation).

(Continued)

*Primary Examiner* — Terrance Kenerly
(74) *Attorney, Agent, or Firm* — Patterson & Sheridan, LLP

(57) ABSTRACT

According to one embodiment, a apparatus for driving a capacitance-type actuator includes a first voltage source, a second voltage source, and a driver. The first voltage source outputs a first voltage to charge the capacitance-type actuator. The second voltage source outputs a second voltage to charge the actuator. The driver switches between first and second charges and first and second discharges. The first charge supplies the first voltage to the actuator. The second charge supplies the sum of the first voltage and the second voltage to the actuator. The first discharge emits a charge accumulated in the actuator and guides the charge to the second voltage source. The second discharge emits the charge accumulated in the actuator without guiding the charge to the second voltage source.

20 Claims, 23 Drawing Sheets

(56) References Cited

FOREIGN PATENT DOCUMENTS

| | | |
|---|---|---|
| JP | 9164676 | 6/1997 |
| JP | H11-314364 | 11/1999 |
| JP | 2000-185400 | 7/2000 |
| JP | 2003-285441 | 10/2003 |
| JP | 2004-088947 | 3/2004 |
| JP | 2004-336904 | 11/2004 |
| JP | 2005-288830 | 10/2005 |
| JP | 2008-023813 | 2/2008 |
| JP | 2010-018028 | 1/2010 |
| JP | 2010-221583 | 10/2010 |

OTHER PUBLICATIONS

Office Action dated Dec. 4, 2013, filed in corresponding Chinese Patent Application No. 201110267950.7 (with English Translation).

* cited by examiner

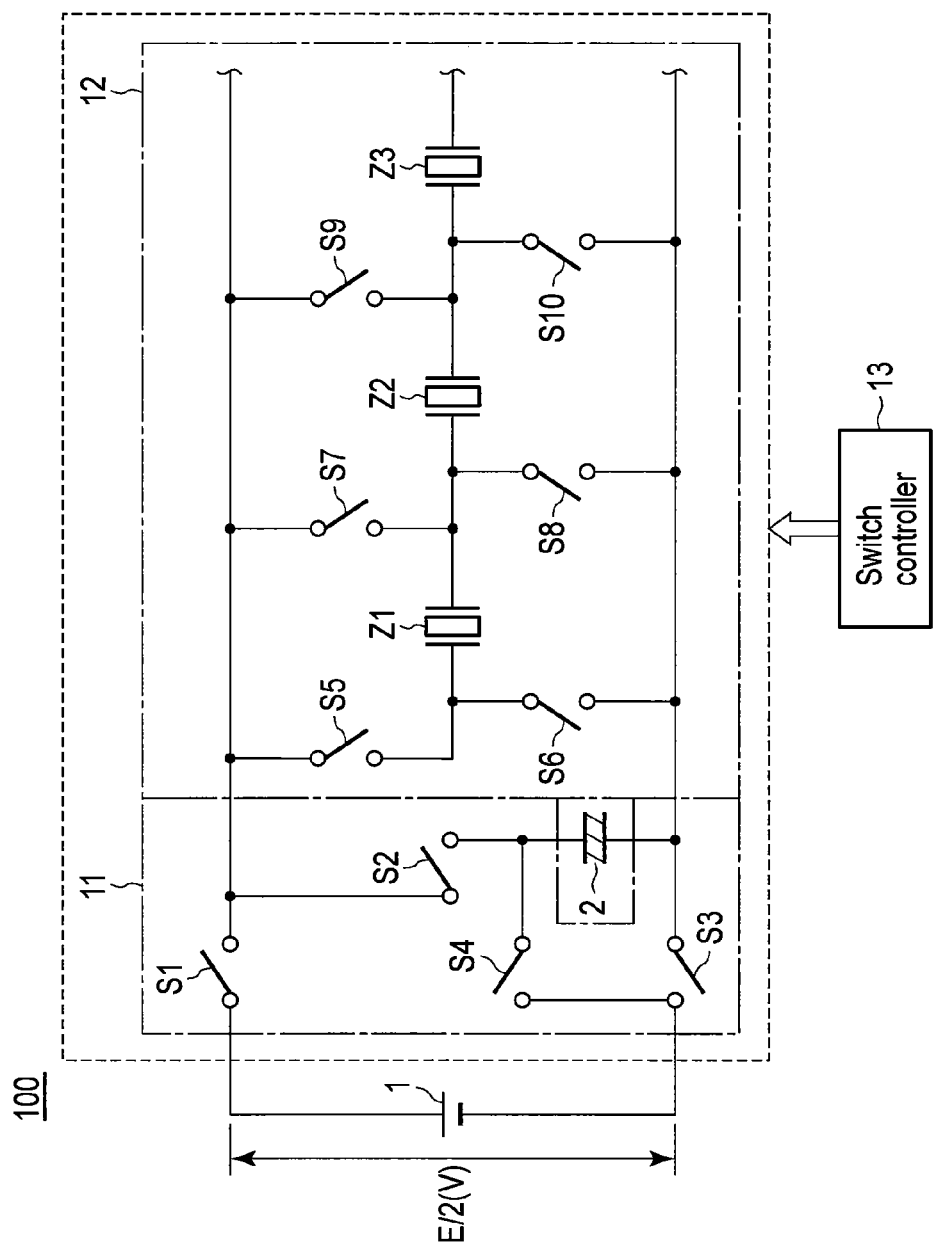
F I G. 1

| Mode | State | S1 | S2 | S3 | S4 | S5 | S6 | S7 | S8 | S9 | S10 |
|---|---|---|---|---|---|---|---|---|---|---|---|
| M1 | Charge 1 | ON | ON | ON | OFF | OFF | ON | ON | OFF | OFF | ON |
| M2 | Charge 2 | ON | OFF | OFF | ON | OFF | ON | ON | OFF | OFF | ON |
| M3 | Discharge 1 | OFF | ON | OFF | OFF | OFF | ON | ON | OFF | OFF | ON |
| M4 | Discharge 2 | ON | ON | ON | OFF | OFF | ON | OFF | ON | OFF | ON |
F I G. 2
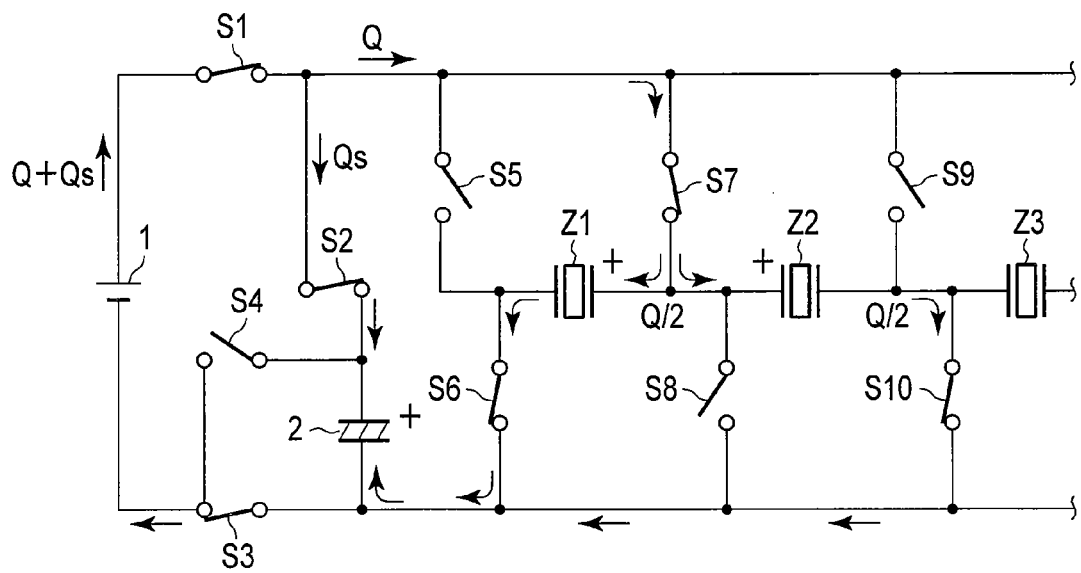
F I G. 3

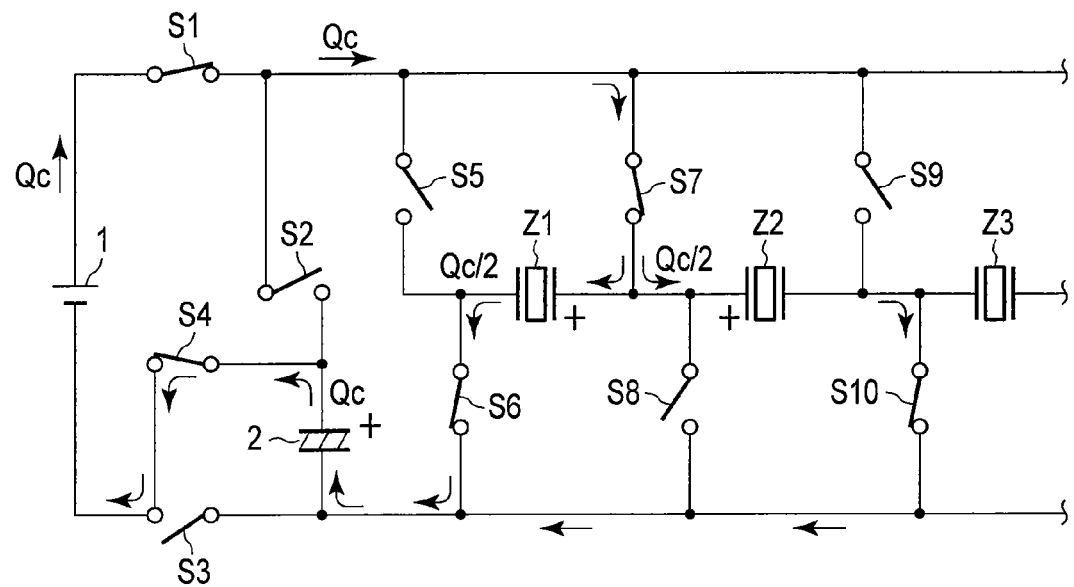
F I G. 4
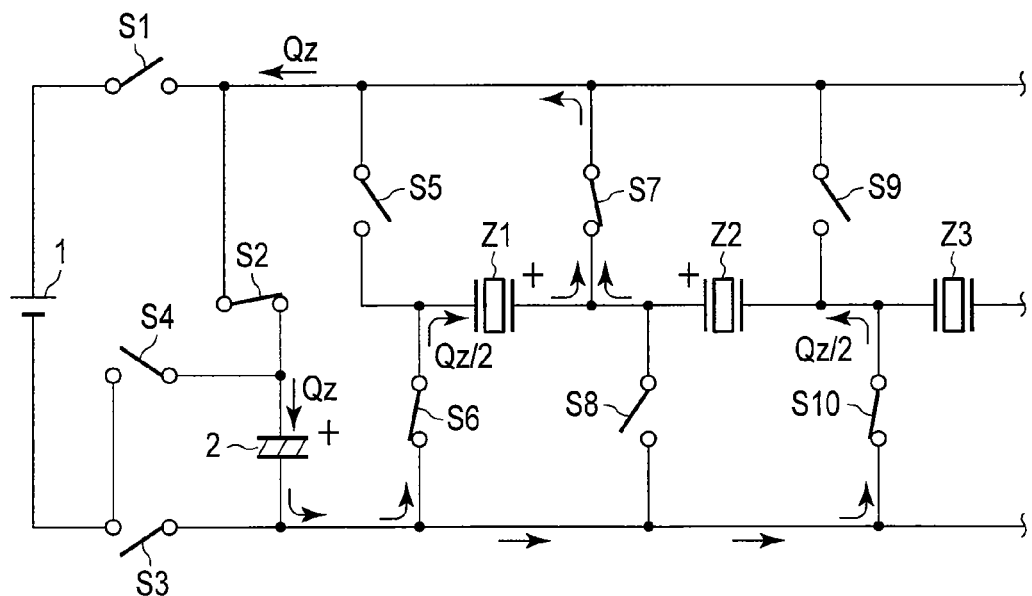
F I G. 5

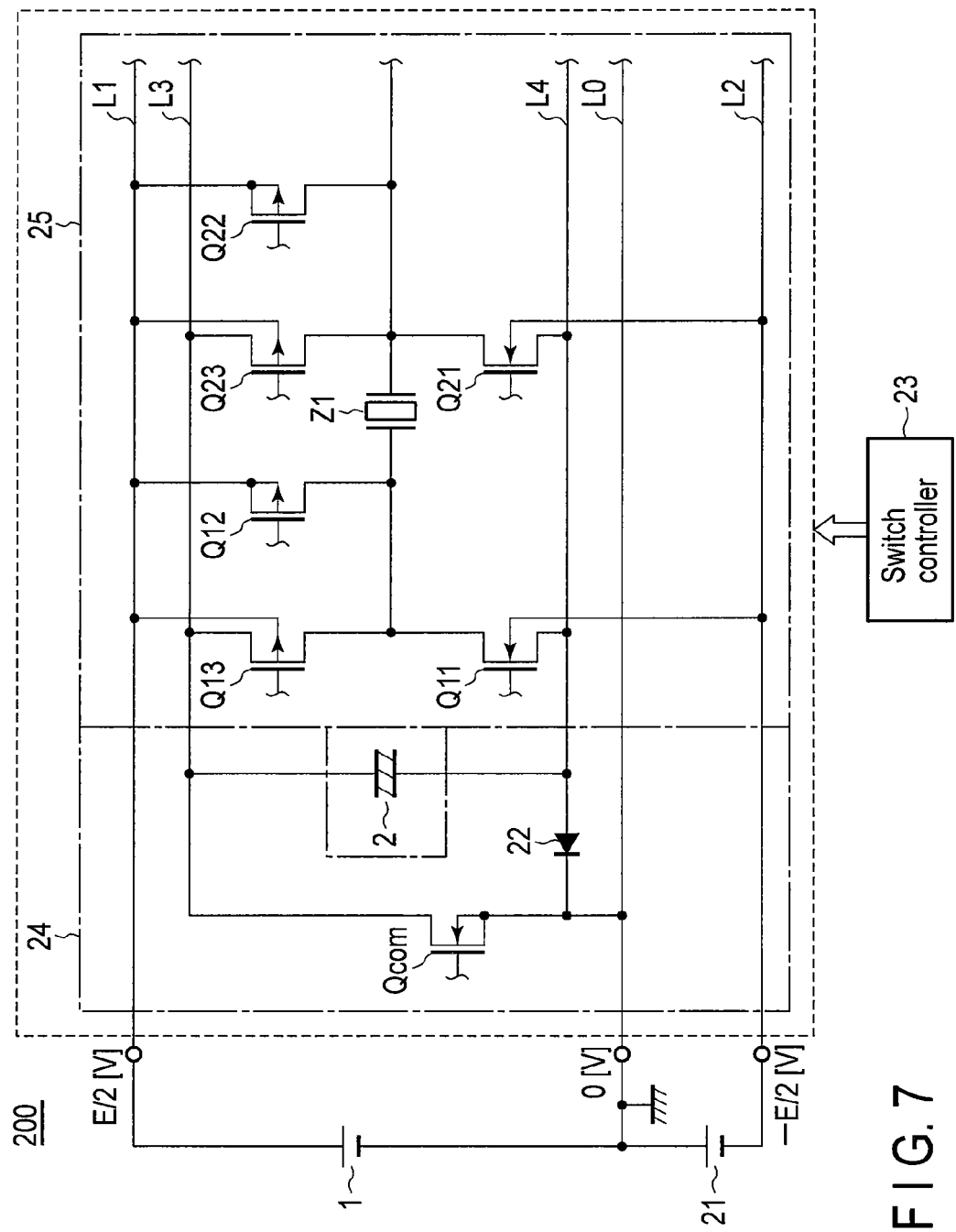
F I G. 7

| Mode | State | Qcom | Q11 | Q12 | Q13 | Q21 | Q22 | Q23 |
|------|-------|------|-----|-----|-----|-----|-----|-----|
| M1 | Charge 1 | OFF | ON | OFF | OFF | OFF | ON | ON |
| M2 | Charge 2 | ON | ON | OFF | OFF | OFF | ON | OFF |
| M3 | Discharge 1 | OFF | ON | OFF | OFF | OFF | OFF | ON |
| M4 | Discharge 2 | OFF | ON | OFF | OFF | ON | OFF | OFF |

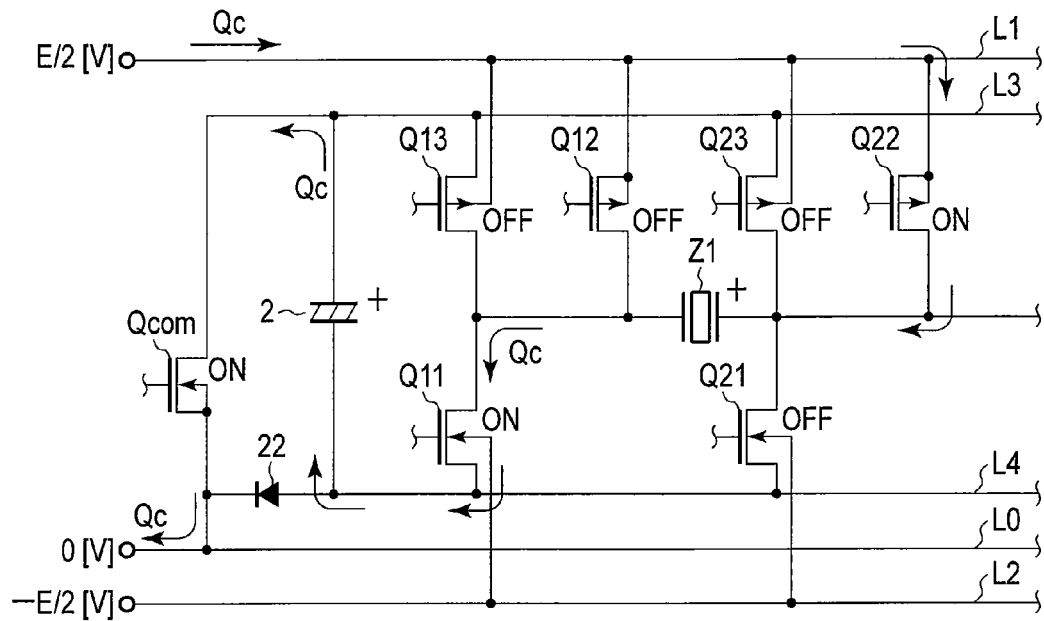
F I G. 10
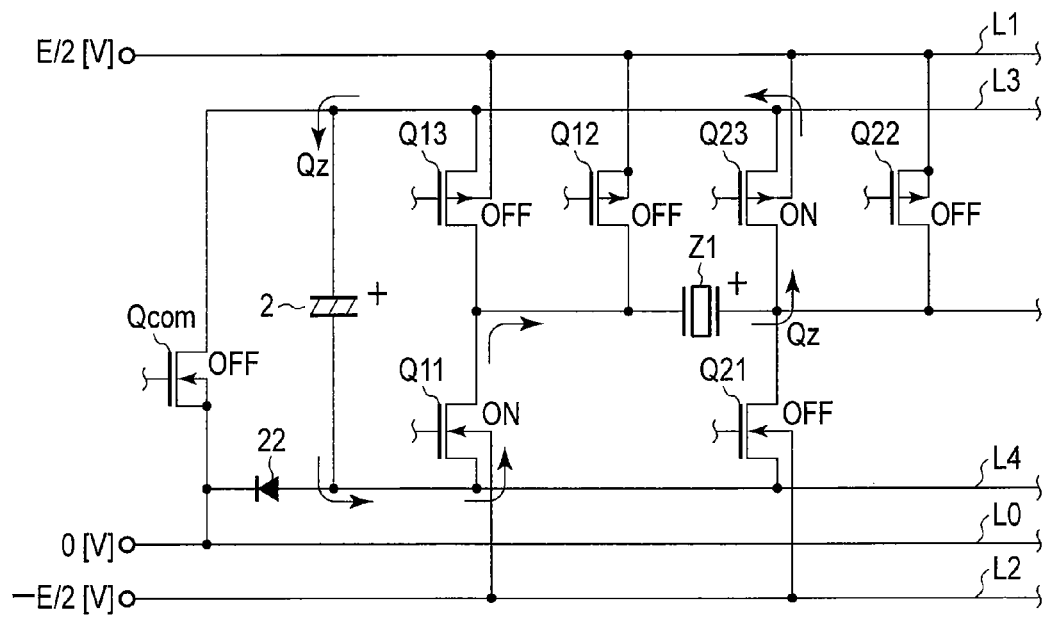
F I G. 11

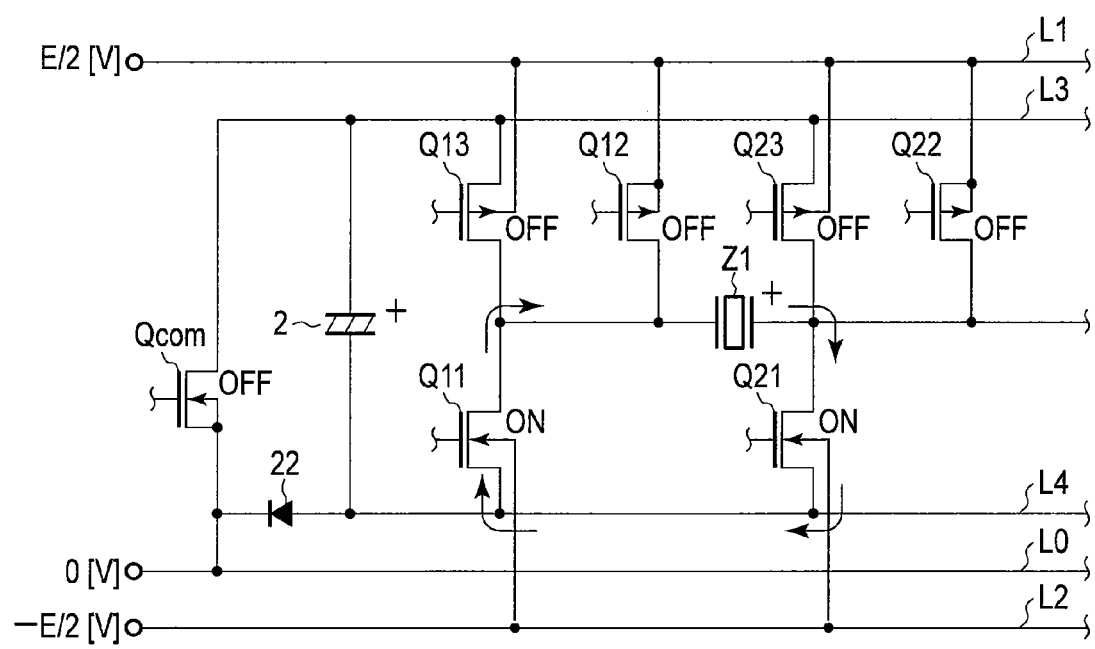
F I G. 1 2

| Mode | State | Qp | Qp2 | Qn | Q11 | Q12 | Q13 | Q21 | Q22 | Q23 |
|------|-------|-----|-----|-----|-----|-----|-----|-----|-----|-----|
| M1 | Waiting | ON | ON | OFF | ON | ON | OFF | ON | ON | OFF |
| M2 | Immediately before charge | ON | OFF | ON | OFF | ON | OFF | OFF | OFF | OFF |
| M3 | Charge 1 | ON | OFF | ON | OFF | ON | OFF | OFF | OFF | ON |
| M4 | Charge 2 | ON | OFF | ON | ON | OFF | OFF | OFF | OFF | ON |
| M5 | Immediately before discharge | OFF | ON | OFF | ON | OFF | OFF | OFF | OFF | OFF |
| M6 | Discharge 1 | OFF | ON | OFF | ON | OFF | OFF | OFF | OFF | ON |
| M7 | Discharge 2 | OFF | ON | OFF | ON | ON | OFF | ON | ON | OFF |

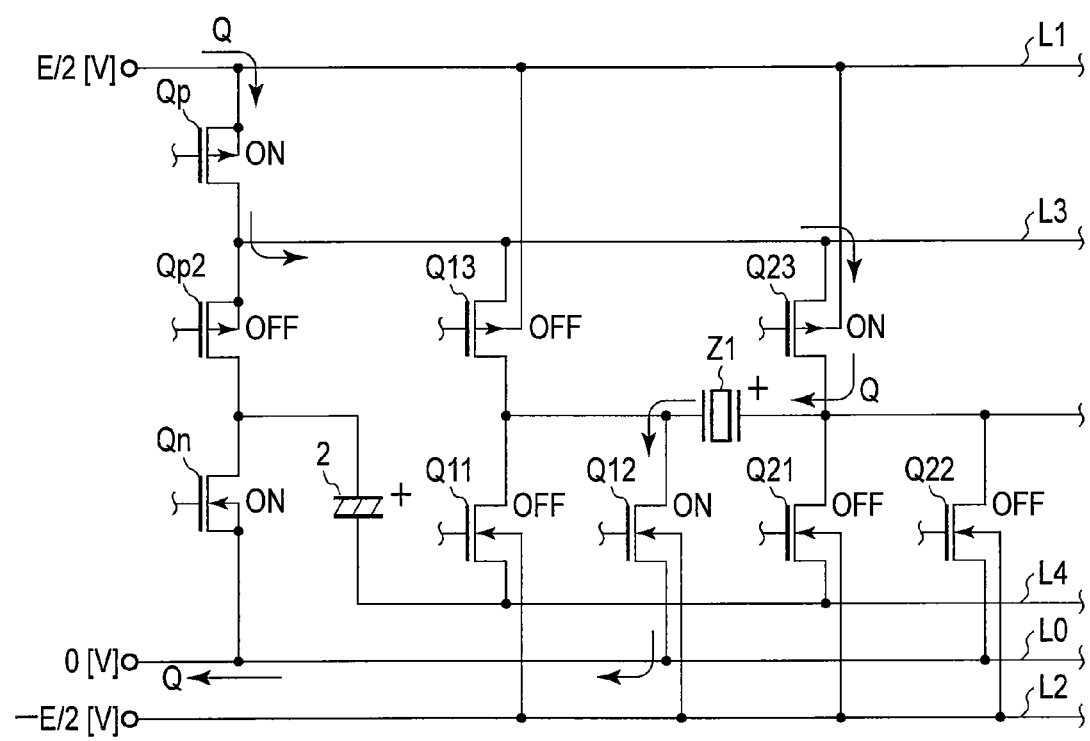
F I G. 17

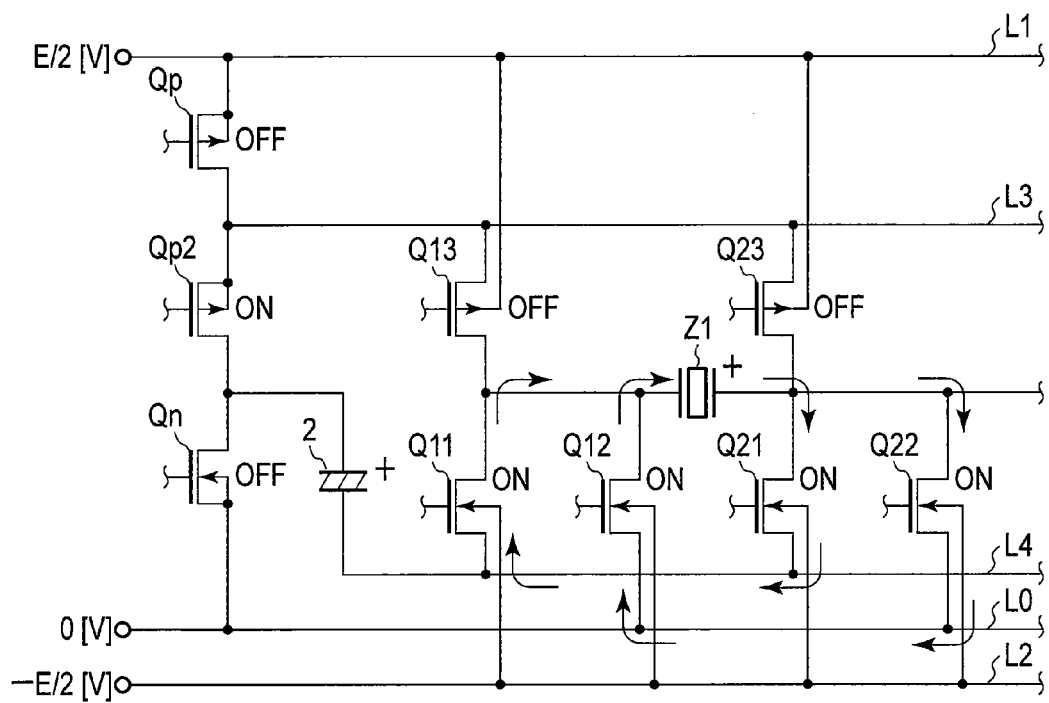
F I G. 2 1

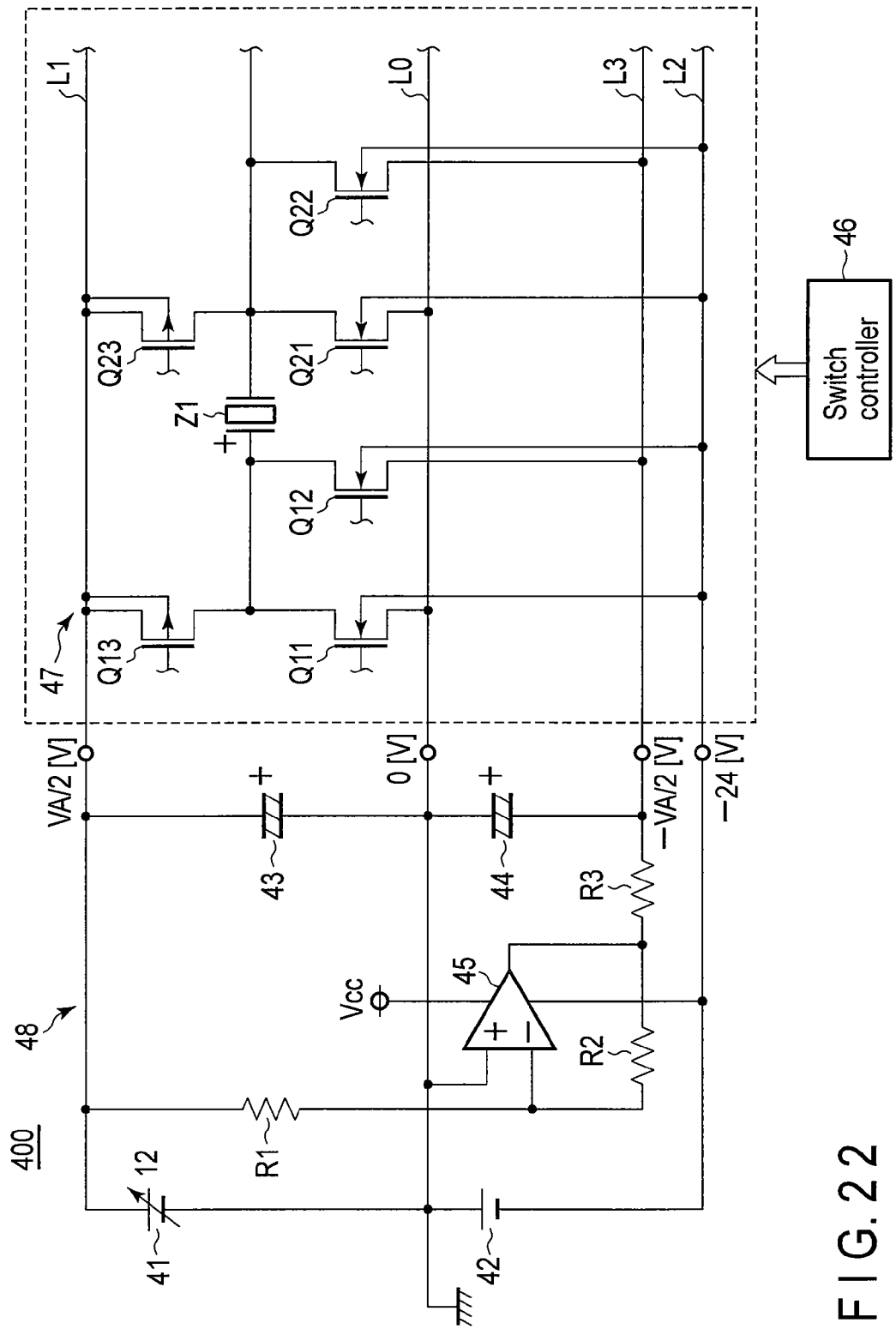
F I G. 22

| Mode | State | Q11 | Q12 | Q13 | Q21 | Q22 | Q23 |
|---|---|---|---|---|---|---|---|
| M1 | Waiting (discharge 2) | ON | OFF | OFF | ON | OFF | OFF |
| M2 | Immediately before charge | OFF | OFF | ON | OFF | OFF | ON |
| M3 | Charge 1 | OFF | OFF | ON | ON | OFF | OFF |
| M4 | Charge 2 | OFF | OFF | ON | OFF | ON | OFF |
| M5 | Discharge 1 | ON | OFF | OFF | OFF | ON | OFF |
| M6 | Discharge 2 (waiting) | ON | OFF | OFF | ON | OFF | OFF |

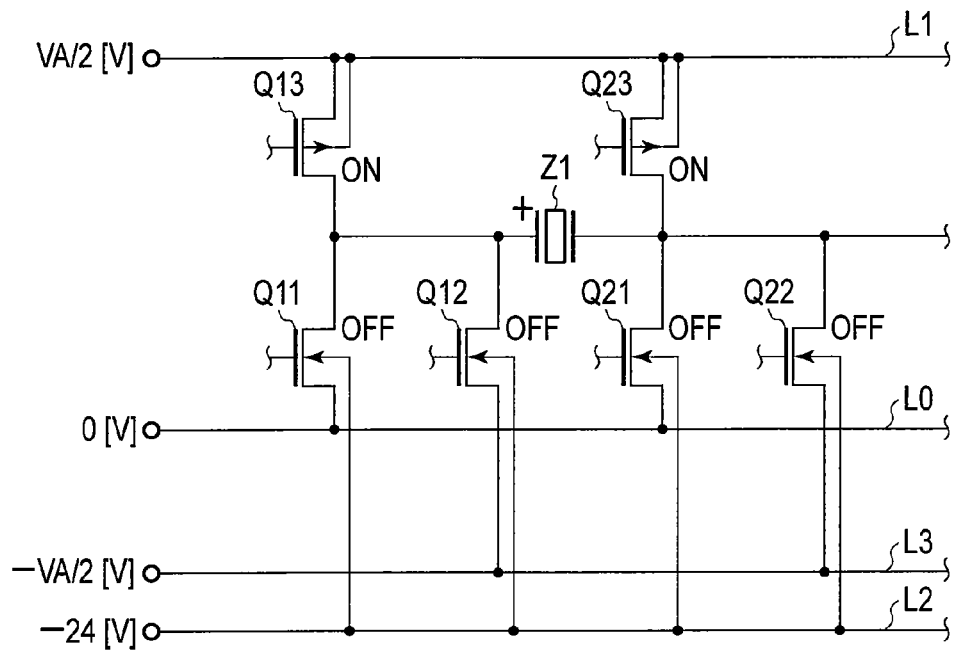
F I G. 2 5
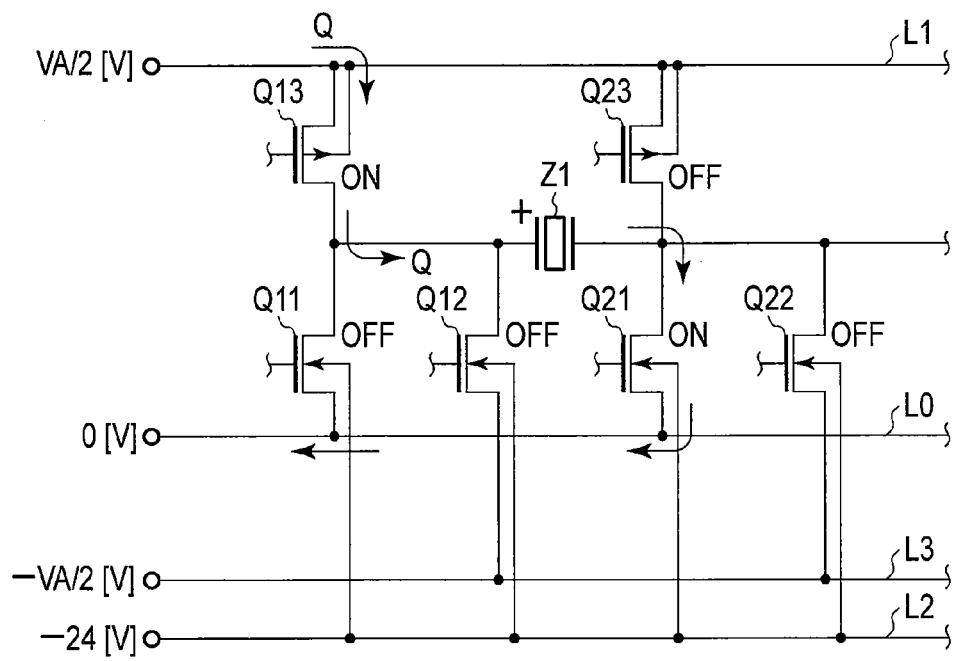
F I G. 2 6

| Mode | State | Q11 | Q12 | Q13 | Q21 | Q22 | Q23 |
|---|---|---|---|---|---|---|---|
| M1 | Waiting (discharge 2) | ON | OFF | OFF | ON | OFF | OFF |
| M2 | Charge 1 | ON | OFF | OFF | OFF | OFF | ON |
| M3 | Charge 2 | OFF | ON | OFF | OFF | OFF | ON |
| M4 | Discharge 1 | OFF | ON | OFF | ON | OFF | OFF |
| M5 | Discharge 2 (waiting) | ON | OFF | OFF | ON | OFF | OFF | ion
APPARATUS AND METHOD FOR DRIVING CAPACITANCE-TYPE ACTUATOR

CROSS-REFERENCE TO RELATED APPLICATIONS

This application is based upon and claims the benefit of priority from prior Japanese Patent Application No. 2010-273249, filed on Dec. 8, 2010, the entire contents of which are incorporated herein by reference.

FIELD

Embodiments described herein relate generally to an apparatus and a method for driving a capacitance-type actuator used in an inkjet head.

BACKGROUND

The piezoelectric type inkjet head includes many elements that are of the capacitance-type actuators as ink ejecting actuators. Therefore, the high speed piezoelectric type inkjet head requires a driving device that drives the capacitance-type actuators at high speed.

The driving device drives the actuator by passing a forward or reverse current through the actuator. The actuator may be charged by the passage of the reverse current after being charged by the passage of the forward current. Thus, the actuator obtains a degree of vibration corresponding to a voltage level double an output voltage of a DC power supply.

The driving device discharges the voltage at the actuator to near zero within a period between the charging performed by the passage of the forward current and the charging performed by the passage of the reverse current. When the discharge period is inserted between the charging period of the passage of the forward current and the charging period of the passage of the reverse current, power consumption becomes a half compared with the case in which a transition is immediately made to the charging performed by the passage of the reverse current from the charging performed by the passage of the forward current or the case in which the actuator is charged only by the passage of the unidirectional current using a value double the output voltage.

However, power consumption in the case including the discharge period is reduced up to a half of the power consumption in the case not including the discharge period. In order to further reduce the power consumption in the case including the discharge period, it is necessary to increase the number of power supplies to perform the multi-stage discharge. However, in such cases, although the power consumption is reduced, unfortunately a configuration of the driving device becomes complicated.

BRIEF DESCRIPTION OF THE DRAWINGS

FIG. 1 is a circuit diagram of a driving device according to a first embodiment;

FIG. 2 is a view illustrating a data table used by a switch controller of the first embodiment;

FIG. 3 is a view illustrating an operation pattern of the driving device of the first embodiment in performing a first sequence mode;

FIG. 4 is a view illustrating an operation pattern of the driving device of the first embodiment in performing a second sequence mode;

FIG. 5 is a view illustrating an operation pattern of the driving device of the first embodiment in performing a third sequence mode;

FIG. 7 is a circuit diagram of a driving device according to a second embodiment;

FIG. 10 is a view illustrating an operation pattern of the driving device of the second embodiment in performing the second sequence mode;

FIG. 11 is a view illustrating an operation pattern of the driving device of the second embodiment in performing the third sequence mode;

FIG. 12 is a view illustrating an operation pattern of the driving device of the second embodiment in performing the fourth sequence mode;

FIG. 17 is a view illustrating an operation pattern of the driving device of the third embodiment in performing the third sequence mode;

FIG. 21 is a view illustrating an operation pattern of the driving device of the third embodiment in performing a seventh sequence mode;

FIG. 22 is a circuit diagram of a driving device according to a fourth and fifth embodiments;

FIG. 25 is a view illustrating an operation pattern of the driving device of the fourth embodiment in performing the second sequence mode;

FIG. 26 is a view illustrating an operation pattern of the driving device of the fourth embodiment in performing the third sequence mode;

DETAILED DESCRIPTION

Figure 6:
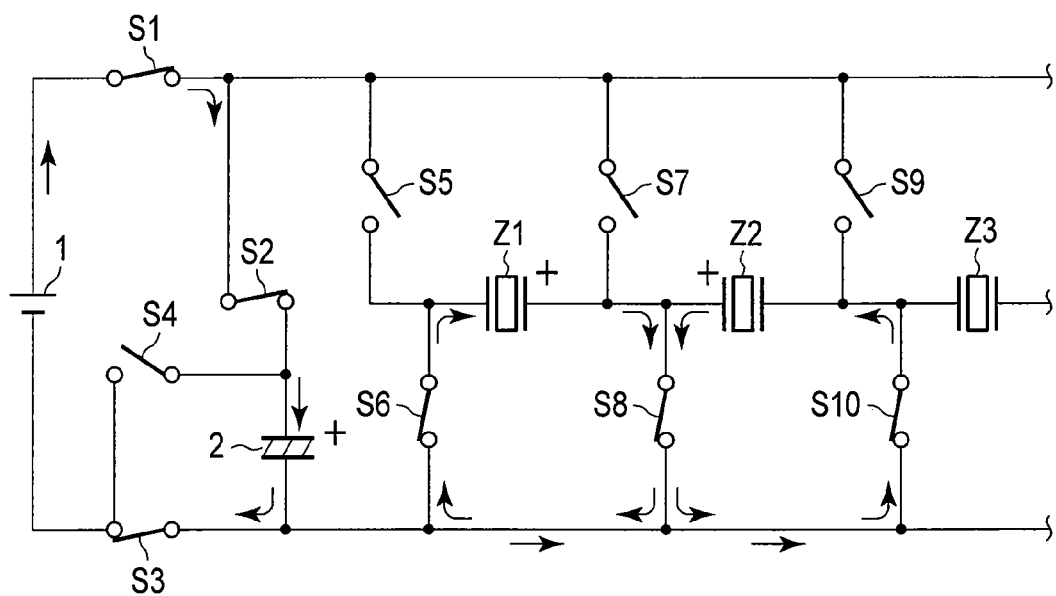
FIG. 6 is a view illustrating an operation pattern of the driving device of the first embodiment in performing a fourth sequence mode.

In general, according to one embodiment, an apparatus for driving a capacitance-type actuator includes a first voltage source, a second voltage source, and a driver. The first voltage source outputs a first voltage to charge the capacitance-type actuator. The second voltage source outputs a second voltage to charge the actuator. The driver switches between first and second charges and first and second discharges. The first charge supplies the first voltage to the actuator. The second charge supplies the sum of the first voltage and the second voltage to the actuator. The first discharge emits a charge accumulated in the actuator and guides the charge to the second voltage source. The second discharge emits the charge accumulated in the actuator without guiding the charge to the second voltage source.

The driving device of the capacitance-type actuator used in the inkjet head will be described below with reference to the drawings.

First Embodiment

A first embodiment will be described with reference to FIGS. 1 to 6.

FIG. 1 is a circuit diagram of a driving device 100 of the first embodiment. As illustrated in FIG. 1, the driving device 100 includes a DC power supply 1, a capacitor 2, plural switches S1, S2, S3, S4, S5, S6, S7, S8, S9, S10, ..., plural actuators Z1, Z2, Z3, ..., and a switch controller 13.

The DC power supply 1 outputs DC voltage E/2. The switch controller 13 switches between turn-on and turn-off of each of the switches S1, S2, S3, S4, S5, S6, S7, S8, S9, and S10.

In the driving device 100, a first terminal of the capacitor 2 is connected to a positive electrode of the DC power supply 1 while the switches S1 and S2 are series-connected therebetween, and a second terminal of the capacitor 2 is connected to a negative electrode of the DC power supply 1 through the switch S3. In the driving device 100, a connection point of the switch S2 and the capacitor 2 is connected to the negative electrode of the DC power supply 1 through the switch S4.

In the driving device 100, a series circuit of the switches S5 and S6, a series circuit of the switches S7 and S8, a series circuit of the switches S9 and S10, ... are sequentially parallel-connected between the connection point of the switches S1 and S2 and the connection point of the switch S3 and the capacitor 2. The capacitance-type actuators Z1, Z2, Z3, ... are connected among the series circuits of the switches. That is, electrodes of actuators Z1, Z2, Z3, ... are series-connected.

Capacitances of actuators Z1, Z2, Z3, ... are substantially equal to one another. The capacitance of the capacitor 2 is sufficiently larger than the sum of the capacitances of the actuators that can simultaneously be driven in actuators Z1, Z2, Z3, ....

The DC power supply 1 outputs the first voltage to charge actuators Z1, Z2, Z3, ... (the first voltage source). The capacitor 2 outputs the second voltage to charge actuators Z1, Z2, Z3, ... (the second voltage source).

A circuit 11 including the switches S1, S2, S3, and S4 is a charging or discharging current-carrying path common to actuators Z1, Z2, Z3, .... A circuit 12 including the switches S5, S6, S7, S8, S9, S10, ... is a charging or discharging current-carrying path for each of actuators Z1, Z2, Z3, ....

In the circuit 11, when the switches S1, S2, and S3 are turned on while the switch S4 is turned off, the capacitor 2 is parallel-connected to the DC power supply 1. Therefore, the capacitor 2 is charged by voltage E/2 of the DC power supply 1. When the switches S1 and S4 are turned on while the switches S2 and S3 are turned off, the capacitor 2 is series-connected to the DC power supply 1. Therefore, voltage E double voltage E/2 output from the DC power supply 1 is supplied to the circuit 12. That is, the circuit 11 acts as a charge pump.

In this embodiment, the inkjet head is a shear-mode, shared-wall type. In this kind of inkjet head, one ink channel includes a set of ink chamber and a nozzle. When the ink is ejected from the nozzle of one ink channel, the two actuators that sandwich the ink channel are operated. That is, one actuator is shared as the ink ejecting actuator by two adjacent ink channels. The electrode that connects ends of the two adjacent actuators corresponds to one ink channel.

An actuator is operated when electrodes at both ends of the actuator are energized. Accordingly, when the ink is ejected from one nozzle, not only the ink channel of the nozzle but also the two ink channels on both the sides thereof are driven. For the sake of convenience, in these three ink channels, the ink channel corresponding to the nozzle that should eject the ink is referred to as a center ink channel, and other two ink channels are referred to as adjacent ink channels.

Operations of charging and discharging adjacent actuators Z1 and Z2 necessary to eject the ink from the nozzle of the center ink channel will be described.

Generally it is possible to design two kinds of actuators, namely, a first-type actuator and a second-type actuator. In the first-type actuator, the ink chamber of the center ink channel is operated in an expansion direction when the positive voltage is applied to the center ink channel while the negative voltages are applied to the adjacent ink channels, and the ink chamber of the center ink channel is operated in a contraction direction when the negative voltage is applied to the center ink channel while the positive voltages are applied to the adjacent ink channels. In the second-type actuator, the ink chamber of the center ink channel is operated in a reverse manner. Hereinafter, the case in which the first-type actuators are used will be described. In the case in which the second-type actuators are used, the direction in which actuators Z1 and Z2 are charged may be inverted with respect to the first-type actuator. That is, in the case in which the second-type actuators are used, the methods for driving the center ink channel and the adjacent ink channels should be replaced with each other.

In order to eject the ink from one nozzle that uses actuators Z1 and Z2, the switch controller 13 switches between the turn-on and the turn-off of each of the switches S1, S2, S3, S4, S5, S6, S7, S8, S9, and S10 according to a data table 10 of FIG. 2. The switch controller 13 includes a logic circuit. The switch controller 13 may include a microcomputer.

In the driving device 100, the turn-on and the turn-off of selected switch result in charging or discharging the adjacent actuators Z1 and Z2.

A first sequence mode M1 charges actuators Z1 and Z2. That is, the switch controller 13 turns on the switches S1, S2, S3, S6, S7, and S10 and turns off the switches S4, S5, S8, and S9.

Therefore, first, second, and third closed circuits are formed as illustrated in FIG. 3. The first closed circuit connects the positive electrode and the negative electrode of the DC power supply 1 through the switches S1 and S2, the capacitor 2, and the switch S3. The second closed circuit connects the positive electrode and the negative electrode of the DC power supply 1 through the switches S1 and S7, actuator Z1, and the switches S6 and S3. The third closed circuit connects the positive electrode and the negative electrode of the DC power supply 1 through the switches S1 and S7, actuator Z2, and the switches S10 and S3.

Accordingly, in a charge Q+Qs output from the DC power supply 1, a charge Qs is supplied to the capacitor 2 by the first closed circuit. Charge Q/2 is supplied to each actuators Z1 and Z2 by the second and third closed circuits, respectively. As a result, the capacitor 2 is charged by DC voltage E/2. Similarly actuators Z1 and Z2 are charged by DC voltage E/2.

A second sequence mode M2 further charges actuators Z1 and Z2. That is, the switch controller 13 turns on the switches S1, S4, S6, S7, and S10 and turns off the switches S2, S3, S5, S8, and S9.

Thus, fourth and fifth closed circuits are formed as illustrated in FIG. 4. The fourth closed circuit connects the positive electrode and the negative electrode of the DC power supply 1 through the switches S1 and S7, actuator Z1, the switch S6, the capacitor 2, and the switch S4. The fifth closed circuit connects the positive electrode and the negative electrode of the DC power supply 1 through the switches S1 and S7, actuator Z2, the switch S10, the capacitor 2, and the switch S4.

Accordingly, a half of a charge Qc output from the DC power supply 1 is supplied to actuators Z1 and Z2 by the fourth and fifth closed circuits, respectively. Charge Qc is emitted from the capacitor 2 charged by DC voltage E/2.

The capacitance of the capacitor 2 is sufficiently larger than the sum of the capacitances of the actuators that can simultaneously be driven in actuators Z1, Z2, Z3, . . . . Therefore, even if charge Qc is emitted from the capacitor 2, the charge voltage of the capacitor 2 is substantially maintained at DC voltage E/2. Accordingly, actuators Z1 and Z2 are charged by voltage E double DC voltage E/2 output from the DC power supply 1.

When the adjacent actuators Z1 and Z2 are charged up to voltage E, the ink chamber of the ink channel that uses actuators Z1 and Z2 are enough expanded from a steady state. As a result, the ink is refilled into the ink chamber.

When the ink chamber is expanded, a pressure at the ink chamber is tentatively decreased. Then the ink is refilled to increase the pressure at the ink chamber. The expansion state of the ink chamber is maintained until the pressure at the ink chamber becomes a predetermined level (generally becomes the maximum). The transition is made to a next sequence when the pressure at the ink chamber becomes the predetermined level.

A third sequence mode M3 discharges actuators Z1 and Z2. That is, the switch controller 13 turns on the switches S2, S6, S7, and S10 and turns off the switches S1, S3, S4, S5, S8, and S9.

Therefore, sixth and seventh closed circuits are formed as illustrated in FIG. 5. The sixth closed circuit connects the positive electrode and the negative electrode of actuator Z1 through the switches S7 and S2, the capacitor 2, and the switch S6. The seventh closed circuit connects the positive electrode and the negative electrode of actuator Z2 through the switches S7 and S2, the capacitor 2, and the switch S10.

At the start of this sequence, actuators Z1 and Z2 are charged by DC voltage E while the capacitor 2 is changed by DC voltage E/2. Therefore, actuators Z1 and Z2 discharge a charge Qz/2, respectively. As a result, the capacitor 2 is charged by charge Qz that is of the sum of charges Qz/2.

The capacitance of the capacitor 2 is sufficiently larger than the sum of the capacitances of the actuators that can simultaneously be driven in actuators Z1, Z2, Z3, . . . . Therefore, even if charge Qz is charged to the capacitor 2, the charge voltage of the capacitor 2 is substantially maintained at voltage E/2. Accordingly, actuators Z1 and Z2 are discharged to voltage E/2.

As a result each of change Qz/2 which is discharged from actuators Z1 and Z2 is equal to Qc/2 and charge Qz by which the capacitor 2 is charged is equal to charge Qc that is emitted from the capacitor 2 in the last second sequence mode M2.

A fourth sequence mode M4 further discharges actuators Z1 and Z2. That is, the switch controller 13 turns on the switches S1, S2, S3, S6, S8, and S10 and turns off the switches S4, S5, S7, and S9.

Therefore, eighth, ninth and first closed circuits are formed as illustrated in FIG. 6. The eighth closed circuit connects the positive electrode and the negative electrode of actuator Z1 through the switches S8 and S6. The ninth closed circuit connects the positive electrode and the negative electrode of actuator Z2 through the switches S8 and S10.

At the start of this sequence, charge voltage E/2 remains in actuators Z1 and Z2. Therefore, each of actuators Z1 and Z2 discharges a remaining charge (Q+Qc−Qz)/2 to become charge voltage 0 (V). As a result, the ink chamber of the ink channel that uses actuators Z1 and Z2 is restored from the expansion state to the steady state. When the ink chamber is restored to the steady state, the ink in the ink chamber is ejected from the corresponding nozzle.

In the meanwhile, the capacitor 2 is adjusted to charge voltage E/2 by the first closed circuit.

The fourth sequence mode M4 is the final sequence of the ejection operation and the steady state of the driving circuit. In the steady state, the charge voltages of actuators Z1 and Z2 become 0 (V) and the charge voltage of the capacitor 2 becomes E/2. Therefore, when the transition is made to the next first sequence mode M1 to drive actuators Z1 and Z2, charge Qs that should charge the capacitor 2 usually becomes substantial 0.

The switches S1, S2, S3, S4, S5, S6, S7, S8, S9, and S10 are thus turned on and off according to the series of charging or discharging sequences of the first to fourth sequence modes M1 to M4 described above. Therefore, the adjacent actuators Z1 and Z2 are charged or discharged. The ink is ejected from the nozzle that uses actuators Z1 and Z2 by the charging and discharging.

In this series of sequences, charge Qc that is emitted from the capacitor 2 in the second sequence mode M2 is equal to charge Qz that is fed back to the capacitor 2 in the third sequence mode M3.

Accordingly, the power is not take out of the second voltage source. Therefore, it is not necessary to provide a circuit that supplies the power to the capacitor 2 of the second voltage source.

Additionally, the DC power supply 1 of the first voltage source may output voltage E/2 that is half the maximum voltage E necessary for actuators Z1, Z2, Z3, . . . . Accordingly, the power consumption of the driving device 100 is reduced to a substantial half of the driving device that is charged once to E.

Above described method of ejecting the ink is such a manner as, 1) expending the chamber, 2) waiting the pressure to be increased, and then 3) setting the chamber back to the original state. But the ink ejecting method is not limited to the first embodiment.

For example, after the fourth sequence mode M4, the ink chamber can be contracted after waiting for the pressure to be decreased. Then the ink chamber should be returned at the appropriate timing. The appropriate additional sequence improves sharpness of the ejected ink droplet and reduces the unwanted vibration of the pressure after ejecting the ink. Alternatively, after the discharge of the fourth sequence mode M4, the ink chamber can be immediately contracted without waiting for the decrease in pressure, for the purpose of increasing the speed and volume of the ink ejection, and then returned at the appropriate timing.

In order to contract the volume of the ink chamber and then return to the original volume of the ink chamber in accordance with the additional sequence afore mentioned above, the charge directions of actuators Z1 and Z2 may be inverted in the first to fourth sequence modes M1 to M4. That is, the center ink channel driving method and the adjacent ink channel driving method may be replaced with each other.

In all of the driving methods described above, charge Qc emitted from the second voltage source is matched with charge Qz fed back to the second voltage source in an interval of the series of sequences of driving the actuators. Therefore, the supply of the power to the second voltage source is eliminated.

Second Embodiment

A second embodiment will be described with reference to FIGS. 7 to 12.

FIG. 7 is a circuit diagram of a driving device 200 of the second embodiment. The component in common with that of FIG. 1 is designated by the same numeral.

FIG. 7 illustrates only circuit elements necessary to drive an actuator Z1. In the second embodiment, although not illustrated, many actuators Z2, Z3, . . . are series-connected similarly to the first embodiment. However, the circuit elements necessary to drive the actuators are identical to one another. Accordingly, the case in which actuator Z1 is charged or discharged will be described below. The detailed descriptions of other actuators Z2, Z3, . . . and the detailed description of the ink ejecting operation are omitted.

As illustrated in FIG. 7, the driving device 200 includes a first DC power supply 1, a capacitor 2, a second DC power supply 21, a diode 22, N-type channel MOS transistors Qcom, Q11, and Q21, P-type channel MOS transistors Q12, Q13, Q22, and Q23, and a switch controller 23.

The switch controller 23 switches between the turn-on and the turn-off of each of MOS transistors Qcom, Q11, Q12, Q13, Q21, Q22, and Q23.

In the second embodiment, the capacitances of actuators Z1, Z2, Z3, . . . are substantially equal to one another. The capacitance of the capacitor 2 is sufficiently larger than the sum of the capacitances of the actuators that can simultaneously be driven in actuators Z1, Z2, Z3, . . . .

The driving device 200 includes first to fourth power supply lines L1, L2, L3, and L4 and a ground line L0 of 0 (V).

The first power supply line L1 is connected to a positive electrode of the first DC power supply 1 that outputs DC voltage E/2. The second power supply line L2 is connected to the negative electrode of the second DC power supply 21 that outputs DC voltage E/2. The positive electrode of the second DC power supply 21 is connected to the negative electrode of the first DC power supply 1. The ground line L0 is connected to the connection point of the positive electrode of the second DC power supply 21 and the negative electrode of the first DC power supply 1. Accordingly, the first power supply line L1 becomes potential E/2. The second power supply line L2 becomes potential −E/2.

The ground line L0 is also connected to a source electrode of MOS transistor Qcom. The third power supply line L3 is connected to a drain electrode of MOS transistor Qcom. The fourth power supply line L4 is connected to the source electrode of MOS transistor Qcom through the diode 22. In the diode 22, the side to which MOS transistor Qcom is connected is set to a cathode.

In the driving device 200, the capacitor 2 is connected between the third power supply line L3 and the fourth power supply line L4. In the driving device 200, a series circuit of MOS transistors Q13 and Q11 and a series circuit of MOS transistors Q23 and Q21 are connected in parallel to the capacitor 2.

In the series circuit of MOS transistors Q13 and Q11, the drain electrodes of MOS transistors Q13 and Q11 are connected to each other. The source electrode of MOS transistor Q13 is connected to the third power supply line L3. The source electrode of MOS transistor Q11 is connected to the fourth power supply line L4.

In the series circuit of MOS transistors Q23 and Q21, the drain electrodes of MOS transistors Q23 and Q21 are connected to each other. The source electrode of MOS transistor Q23 is connected to the third power supply line L3. The source electrode of MOS transistor Q21 is connected to the fourth power supply line L4.

In the driving device 200, the drain electrode of MOS transistor Q12 is connected to the connection point of the drain electrodes of MOS transistors Q13 and Q11. The source electrode of MOS transistor Q12 is connected to the first power supply line L1.

In the driving device 200, the drain electrode of MOS transistor Q22 is connected to the connection point of the drain electrodes of MOS transistors Q23 and Q21. The source electrode of MOS transistor Q22 is connected to the first power supply line L1.

In the driving device 200, the capacitance-type actuator Z1 is connected between the connection point of the drain electrodes of MOS transistors Q11, Q12, and Q13 and the connection point of the drain electrodes of MOS transistors Q21, Q22, and Q23.

In the N-type channel MOS transistors Qcom, Q11, and Q21, a back gate of MOS transistor Qcom is connected to the ground line L0. The back gates of MOS transistors Q11 and Q21 are connected to the second power supply line L2 having potential −E/2.

The back gates of the P-type channel MOS transistors Q12, Q13, Q22, and Q23 are connected to the first power supply line L1 having potential E/2.

The first DC power supply 1 outputs the first voltage to charge actuator Z1 (the first voltage source). The capacitor 2 outputs the second voltage to charge actuator Z1 (the second voltage source).

A circuit 24 including the diode 22 and MOS transistor Qcom is a charging or discharging common current-carrying path with respect to actuators Z1, Z2, Z3, ..., though in FIG. 7, only the actuator Z1 is illustrated. A circuit 25 including MOS transistors Q11, Q12, Q13, Q21, Q22, and Q23 is a charging or discharging individual current-carrying path with respect to actuator Z1.

In the circuit 24, when MOS transistors Q12 and Q13 are turned on while MOS transistor Qcom is turned off, the diode 22 is turned on to parallel-connect the first DC power supply 1 and the capacitor 2. Therefore, the capacitor 2 is charged. The same holds true for the case in which MOS transistors Q22 and Q23 are turned on or for the case in which MOS transistors Q12, Q13, Q22, and Q23 are turned on.

On the other hand, when MOS transistor Qcom is turned on while the power supply line L3 is not connected to another power supply line, the diode 22 is cut off to series-connect the DC power supply 1 and the capacitor 2. Therefore, voltage E which is double the voltage of E/2 of the DC power supply 1 is supplied between the first power supply line L1 and the fourth power supply line L4. That is, the circuit 24 acts as a charge pump.

The gates of MOS transistors Qcom, Q11, Q12, Q13, Q21, Q22, and Q23 are connected to the switch controller 23. The switch controller 23 switches between the turn-on and the turn-off of each of MOS transistors Qcom, Q11, Q12, Q13, Q21, Q22, and Q23 according to a data table 20 of FIG. 8. The switch controller 23 includes a logic circuit. The switch controller 23 may include a microcomputer.

In the driving device 200, the turn-on and the turn-off of each of MOS transistors Qcom, Q11, Q12, Q13, Q21, Q22, and Q23 perform a series of charging or discharging sequences to actuator Z1.

A first sequence mode M1 charges actuator Z1. The switch controller 23 turns on MOS transistors Q11, Q22, and Q23 and turns off MOS transistors Qcom, Q12, Q13, and Q21.

Figures 8, 9:
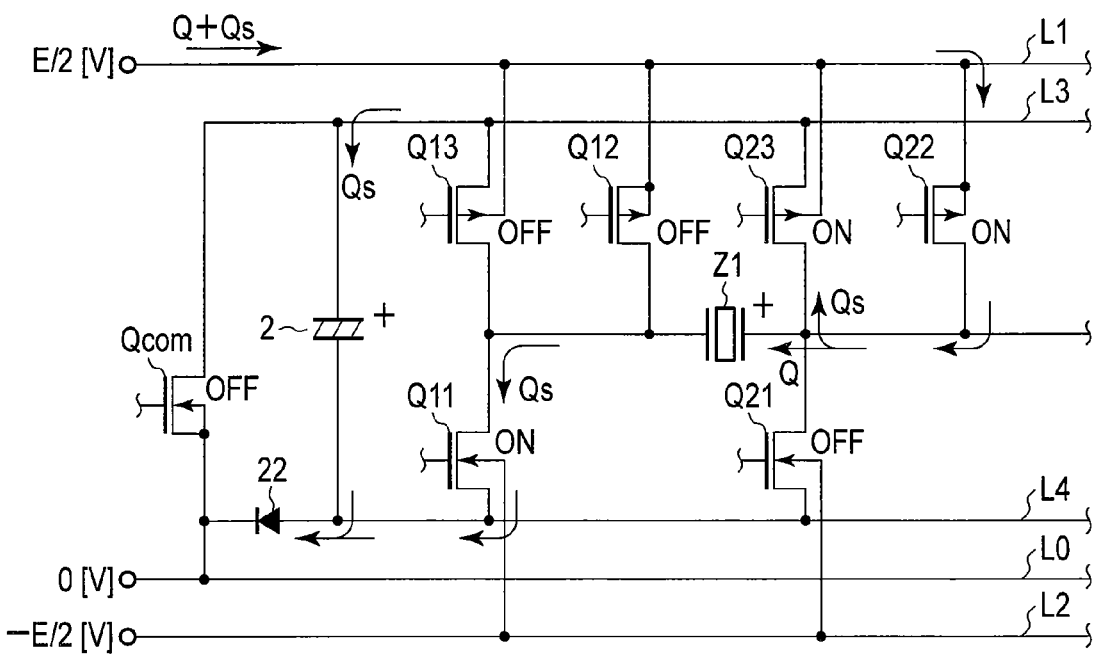
FIG. 8 is a view illustrating a data table used by a switch controller of the second embodiment.
FIG. 9 is a view illustrating an operation pattern of the driving device of the second embodiment in performing the first sequence mode.

Therefore, as illustrated in FIG. 9, first and second series circuits are formed between the first power supply line L1 and the ground line L0. MOS transistor Q22, actuator Z1, MOS transistor Q11, and the diode 22 are series-connected in the first series circuit. MOS transistors Q22 and Q23, the capacitor 2, and the diode 22 are series-connected in the second series circuit.

The first power supply line L1 has potential E/2. The ground line L0 has potential 0 (V). Accordingly, in a charge Q+Qs output from the first DC power supply 1, a charge Q is supplied to actuator Z1 through MOS transistor Q22. A charge Qs is supplied to the capacitor 2 through MOS transistors Q22 and Q23. As a result, the capacitor 2 is charged by DC voltage E/2. Similarly actuator Z1 is charged by DC voltage E/2.

A second sequence mode M2 further charges actuator Z1. The switch controller 23 turns on MOS transistors Qcom, Q11, and Q22 and turns off MOS transistors Q12, Q13, Q21, and Q23.

As illustrated in FIG. 10, the positive electrode of the capacitor 2 charged by voltage E/2 becomes potential 0 (V) by the turn-on of MOS transistor Qcom. Therefore, the negative electrode of the capacitor 2 becomes potential −E/2. On the diode 22, the cathode has potential 0 (V) and the anode has potential −E/2. Therefore, the diode 22 is not off state.

As a result, a third series circuit is formed between the first power supply line L1 and the ground line L0. MOS transistor Q22, actuator Z1, MOS transistor Q11, the capacitor 2, and MOS transistor Qcom are series-connected in the third series circuit.

Accordingly, a charge Qc output from the positive electrode of the DC power supply 1 is supplied to the positive electrode of actuator Z1 by the third series circuit. At the same time, charge Qc is emitted from the capacitor 2 charged by DC voltage E/2. Charge Qc is supplied to the negative electrode of the DC power supply 1 through MOS transistor Qcom.

In this sequence, the negative electrode of actuator Z1 is connected to the negative electrode of the capacitor 2 through MOS transistor Q11. Therefore, actuator Z1 is charged by voltage E which is double DC voltage of E/2 output from the DC power supply 1.

A third sequence mode M3 discharges actuator Z1. The switch controller 23 turns on MOS transistors Q11 and Q23 and turns off MOS transistors Qcom, Q12, Q13, Q21, and Q22.

Therefore, a tenth closed circuit is formed as illustrated in FIG. 11. The tenth closed circuit connects the positive electrode and the negative electrode of actuator Z1 through MOS transistor Q23, the capacitor 2, and MOS transistor Q11.

The capacitor 2 is previously charged by voltage E/2. Accordingly, a charge Qz is emitted from actuator Z1 which had been charged by DC voltage E, and then the actuator Z1 is discharged down to voltage E/2.

Charge Qz emitted from actuator Z1 charges the capacitor 2.

The capacitance of the capacitor 2 is sufficiently larger than the sum of the capacitances of the actuators that can simultaneously be driven in actuators Z1, Z2, Z3, .... Therefore, even if charges Qc and Qz are emitted or fed back, the charge voltage of the capacitor 2 in the second or third sequence mode M2 or M3 is substantially maintained at voltage E/2.

So, charge Qz fed back to the capacitor 2 is equal to charge Qc that is emitted from the capacitor 2 in the last second sequence mode M2.

A fourth sequence mode M4 further discharges actuator Z1. The switch controller 23 turns on MOS transistors Q11 and Q21 and turns off MOS transistors Qcom, Q12, Q13, Q22, and Q23.

Therefore, an eleventh closed circuit is formed as illustrated in FIG. 12. The eleventh closed circuit connects the positive electrode and the negative electrode of actuator Z1 through MOS transistors Q21 and Q11. Accordingly, the charge is further emitted from actuator Z1, and actuator Z1 is discharged down to voltage 0 (V).

Thus, MOS transistors Qcom, Q11, Q12, Q13, Q21, Q22, and Q23 are turned on and off according to the series of charging or discharging sequences of the first to fourth sequence modes M1, M2, M3, and M4. Accordingly, actuator Z1 is charged or discharged.

The voltage change on Z1 at each transition between M1, M2, M3, and M4 are all the same value of E/2 (V). So Q, Qc, and Qz are the same.

In this embodiment, charge Qs by which the capacitor 2 is charged in the first sequence mode M1 becomes smaller as the voltage of capacitor 2 just before the first sequence becomes closer to E/2 (V).

In the steady state in which the actuator is not driven, MOS transistors Qcom, Q11, and Q12 should be turned off, and MOS transistors Q12, Q13, Q22, and Q23 should be turned on. Then, the electric conduction state is established between the positive electrode of the DC power supply 1 and the positive electrode of the capacitor 2. In the mean time the electric conduction state is also established between the negative electrode of the DC power supply 1 and the negative electrode of the capacitor 2 through the diode 22. The charge voltage of the capacitor 2 is steadily maintained at E/2. As a result, charge Qs substantially becomes zero except the power-on state.

In the second embodiment, charge Qc that is emitted from the capacitor 2 in the second sequence mode M2 is equal to charge Qz that is fed back to the capacitor 2 in the third sequence mode M3. Accordingly, the power is not take out of the second voltage source. Therefore, it is not necessary to provide a circuit that supplies the power to the capacitor 2 of the second voltage source.

Additionally, the DC power supply 1 of the first voltage source may output voltage E/2 that is half the maximum voltage E necessary for actuators Z1, Z2, Z3, . . . . Accordingly, the power consumption of the driving device 200 is reduced to a substantial half of the driving device that is charged once to E.

Accordingly, the same effect as the first embodiment is obtained.

The second DC power supply 21 of the second embodiment provides just a bias to the back gates of the N-type channel MOS transistors Q11 and Q21. Accordingly, there is no significantly power consumption in the second DC power supply 21.

Third Embodiment

A third embodiment will be described with reference to FIGS. 13 to 21.

Figure 13:
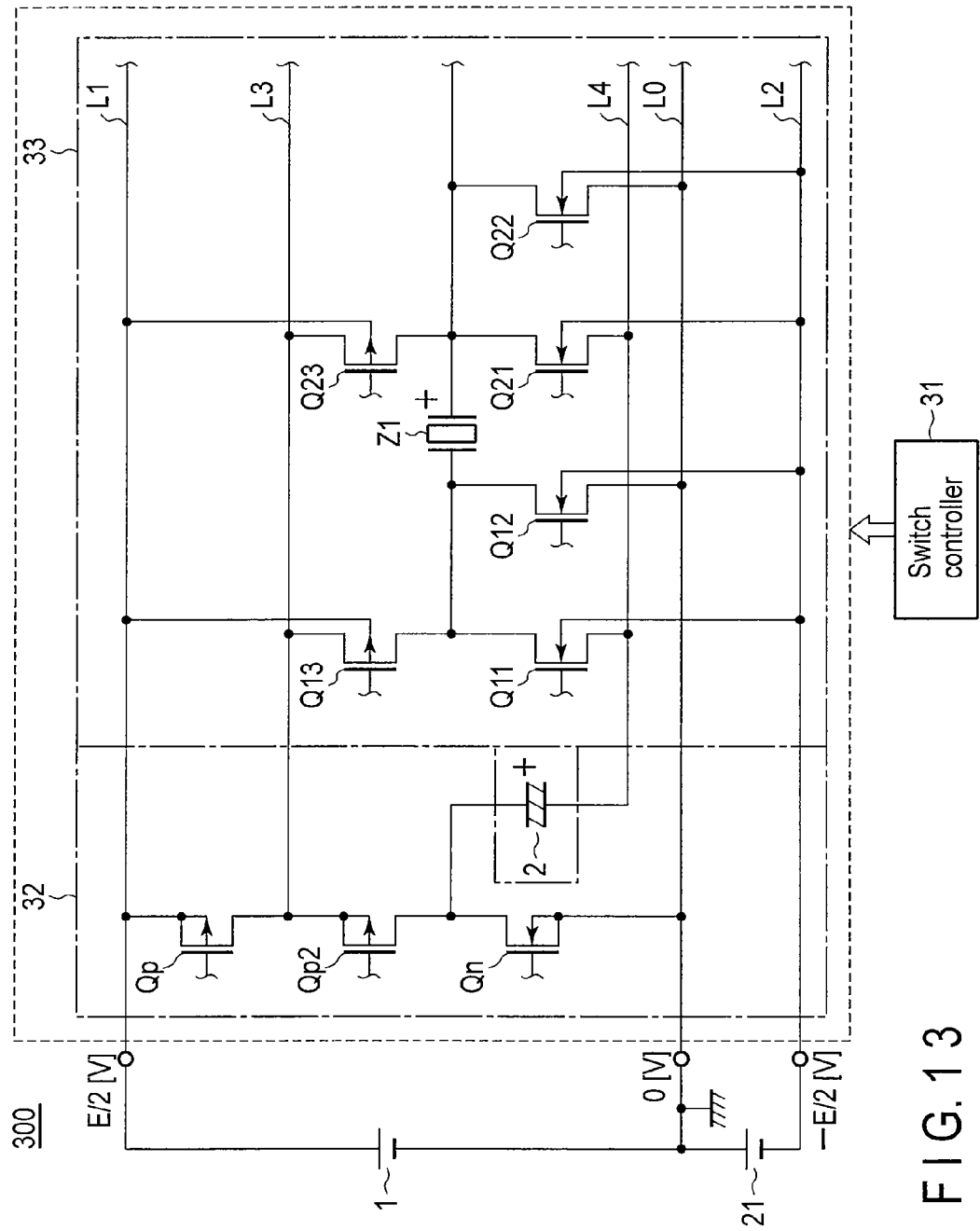
FIG. 13 is a circuit diagram of a driving device according to a third embodiment.

FIG. 13 is a circuit diagram of a driving device 300 of the third embodiment, and only the circuit elements necessary to drive an actuator Z1 are illustrated in FIG. 13 for the same reason as the second embodiment. The component in common with that of FIG. 7 is designated by the same numeral.

As illustrated in FIG. 13, the driving device 300 includes a first DC power supply 1, a capacitor 2, a second DC power supply 21, N-type channel MOS transistors Qn, Q11, Q12, Q21, and Q22, P-type channel MOS transistors Qp, Qp2, Q13, and Q23, and a switch controller 31.

The switch controller 31 switches between the turn-on and the turn-off of each of MOS transistors Qp, Qp2, Qn, Q11, Q12, Q13, Q21, Q22, and Q23.

In the third embodiment, the capacitances of actuators Z1, Z2, Z3, . . . are substantially equal to one another. The capacitance of the capacitor 2 is sufficiently larger than the sum of the capacitances of the actuators that can simultaneously be driven in actuators Z1, Z2, Z3, . . . .

The driving device 300 includes first to fourth power supply lines L1, L2, L3, and L4 and a ground line L0 of 0 V.

The first power supply line L1 is connected to a positive electrode of the first DC power supply 1 that outputs DC voltage E/2. The second power supply line L2 is connected to the negative electrode of the second DC power supply 21 that outputs DC voltage E/2. The positive electrode of the second DC power supply 21 is connected to the negative electrode of the first DC power supply 1. The ground line L0 is connected to the connection point of the positive electrode of the second DC power supply 21 and the negative electrode of the first DC power supply 1. Accordingly, the first power supply line L1 becomes potential E/2 (V). The second power supply line L2 becomes potential –E/2 (V).

In the driving device 300, a series circuit of MOS transistors Qp, Qp2, and Qn is connected between the first power supply line L1 and the ground line L0. The source electrode of MOS transistor Qp is connected to the first power supply line L1. The drain electrode of MOS transistor Qp is connected to the source electrode of MOS transistor Qp2. The drain electrode of MOS transistor Qp2 is connected to the drain electrode of MOS transistor Qn. The source electrode of MOS transistor Qn is connected to the ground line L0.

The third power supply line L3 is connected to the connection point of the drain electrode of MOS transistor Qp and the source electrode of MOS transistor Qp2. The fourth power supply line L4 is connected to the connection point of the drain electrode of MOS transistor Qp2 and the drain electrode of MOS transistor Qn through the capacitor 2.

In the driving device 300, a series circuit of MOS transistors Q13 and Q11 and a series circuit of MOS transistors Q23 and Q21 are parallel-connected between the third power supply line L3 and the fourth power supply line L4.

In the series circuit of MOS transistors Q13 and Q11, the drain electrodes of MOS transistors Q13 and Q11 are connected to each other. The source electrode of MOS transistor Q13 is connected to the third power supply line L3. The source electrode of MOS transistor Q11 is connected to the fourth power supply line L4.

In the series circuit of MOS transistors Q23 and Q21, the drain electrodes of MOS transistors Q23 and Q21 are connected to each other. The source electrode of MOS transistor Q23 is connected to the third power supply line L3. The source electrode of MOS transistor Q21 is connected to the fourth power supply line L4.

In the driving device 300, the drain electrode of MOS transistor Q12 is connected to the connection point of the drain electrodes of MOS transistors Q13 and Q11. The source electrode of MOS transistor Q12 is connected to the ground line L0.

In the driving device 300, the drain electrode of MOS transistor Q22 is connected to the connection point of the drain electrodes of MOS transistors Q23 and Q21. The source electrode of MOS transistor Q22 is connected to the ground line L0.

In the driving device 300, the capacitance-type actuator Z1 is connected between the connection point of the drain electrodes of MOS transistors Q11, Q12, and Q13 and the connection point of the drain electrodes of MOS transistors Q21, Q22, and Q23.

The back gate of MOS transistor Qn is connected to the ground line L0. The back gates of MOS transistors Q11, Q12, Q21, and Q22 are connected to the second power supply line L2.

The second DC power supply 21 provides just the bias to the back gates of the N-type channel MOS transistors Q11, Q12, Q21, and Q22. Accordingly, there is no significantly power consumption in the second DC power supply 21.

The back gates of MOS transistors Qp, Q13, and Q23 are connected to the first power supply line L1. The back gate of MOS transistor Qp2 is connected to the third power supply line L3.

The first DC power supply 1 outputs the first voltage to charge actuator Z1 (the first voltage source). The capacitor 2 outputs the second voltage to charge actuator Z1 (the second voltage source).

A circuit 32 including MOS transistor Qp, Qp2, and Qn is a charging or discharging common current-carrying path with respect to actuators Z1, Z2, Z3, . . . , though in FIG. 13, only the actuator Z1 is illustrated. A circuit 33 including MOS transistors Q11, Q12, Q13, Q21, Q22, and Q23 is a charging or discharging individual current-carrying path with respect to actuator Z1.

In the circuit 32, in the case in which MOS transistors Qp and Qp2 are turned on while MOS transistor Qn is turned off, the first DC power supply 1 and the capacitor 2 are parallel-connected when the N-type channel MOS transistors Q11 and Q12 are turned on. Therefore, the capacitor 2 is charged. The same holds true for the case in which MOS transistors Q21 and Q22 are turned on or for the case in which MOS transistors Q11, Q12, Q21, and Q22 are turned on.

In the case, MOS transistors Qp and Qn are turned on while MOS transistor Qp2 being turned off, the power supply 1 and the capacitor 2 are series connected between power supply lines L3 and L4. Therefore, voltage E which is double the voltage of E/2 of the first DC power supply 1 is supplied between the third power supply line L3 and the fourth power supply line L4. That is, the circuit 32 acts as a charge pump.

The gates of MOS transistors Qp, Qp2, Qn, Q11, Q12, Q13, Q21, Q22, and Q23 are connected to the switch controller 31. The switch controller 31 switches between the turn-on and the turn-off of each of MOS transistors Qp, Qp2, Qn, Q11, Q12, Q13, Q21, Q22, and Q23 according to a data table 30 of FIG. 14. The switch controller 31 includes a logic circuit. The switch controller 31 may include a microcomputer.

In the driving device 300, the turn-on and the turn-off of each of MOS transistors Qp, Qp2, Qn, Q11, Q12, Q13, Q21, Q22, and Q23 perform a series of charging or discharging sequences to actuator Z1.

A first sequence mode M1 is a waiting state before actuator Z1 is charged. The switch controller 31 turns on MOS transistors Qp, Qp2, Q11, Q12, Q21, and Q22 and turns off MOS transistors Qn, Q13, and Q23.

Figures 14, 15:
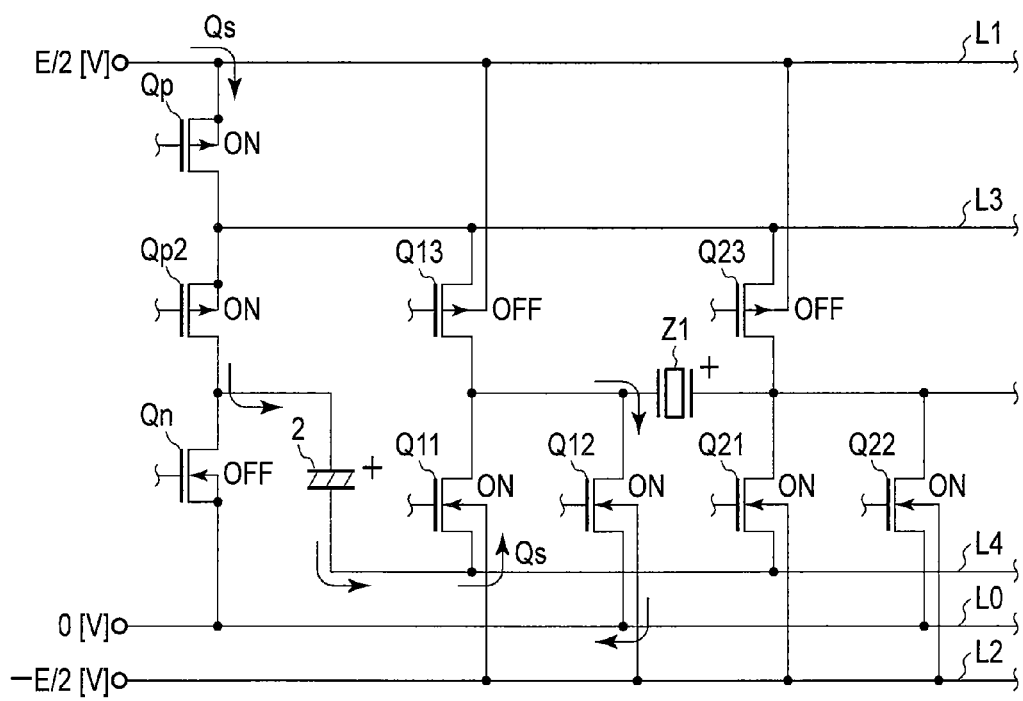
FIG. 14 is a view illustrating a data table used by a switch controller of the third embodiment.
FIG. 15 is a view illustrating an operation pattern of the driving device of the third embodiment in performing the first sequence mode.

Therefore, as illustrated in FIG. 15, a fourth series circuit is formed between the first power supply line L1 and the ground line L0. MOS transistors Qp and Qp2, the capacitor 2, and MOS transistors Q11 and Q12 are series-connected in the fourth series circuit. Alternatively, MOS transistors Qp and Qp2, the capacitor 2, and MOS transistors Q21 and Q22 are series-connected in the fourth series circuit.

The first power supply line L1 has potential E/2 (V). The ground line L0 has potential 0 V. Accordingly, a charge Qs output from the first DC power supply 1 is supplied to the capacitor 2 through MOS transistors Qp and Qp2. As a result, the capacitor 2 is charged by DC voltage E/2 (V).

At this point, the third power supply line L3 is connected to the first DC power supply 1 through MOS transistor Qp. Accordingly, the third power supply line L3 becomes potential E/2 (V).

A second sequence mode M2 is performed immediately before the charging of actuator Z1 is started, for example, 1 μs before. The switch controller 31 turns on MOS transistors Qp, Qn, and Q12 and turns off MOS transistors Qp2, Q11, Q13, Q21, Q22, and Q23.

Figure 16:
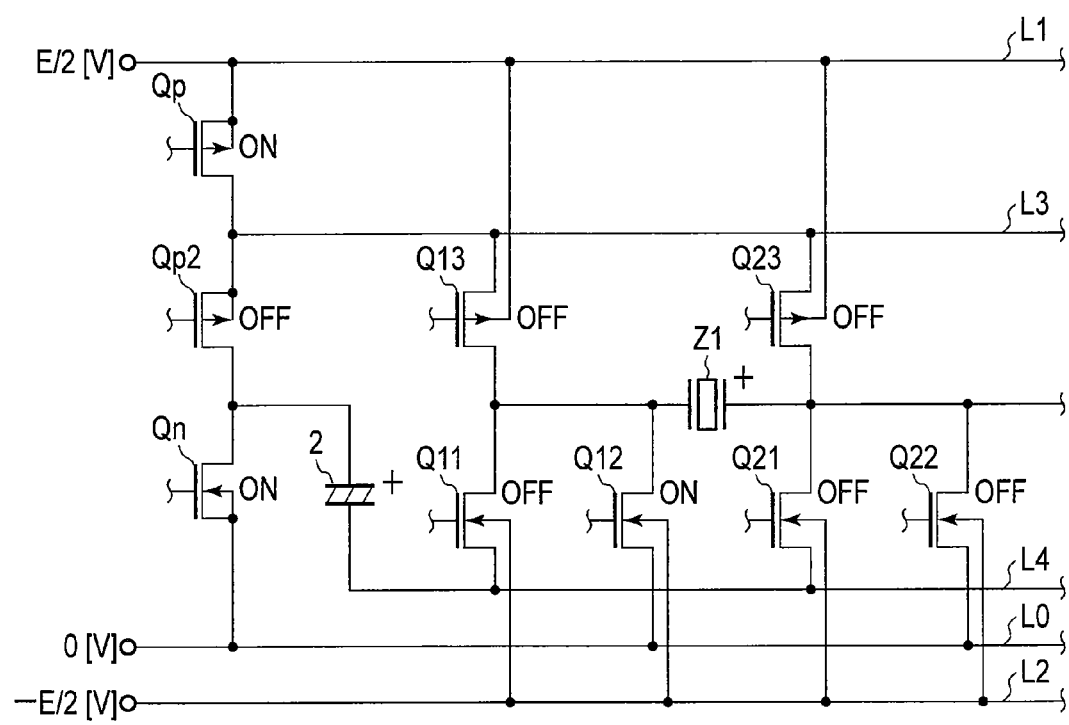
FIG. 16 is a view illustrating an operation pattern of the driving device of the third embodiment in performing the second sequence mode.

As illustrated in FIG. 16, the positive electrode of the capacitor 2 is connected to the ground line L0 through MOS transistor Qn. Therefore, the negative electrode of the capacitor 2 charged by DC voltage E/2 becomes potential −E/2 (V). The negative electrode of actuator Z1 is connected to the ground line L0. Therefore, the negative electrode of actuator Z1 becomes potential 0 (V).

A third sequence mode M3 charges actuator Z1. The switch controller 31 turns on MOS transistors Qp, Qn, Q12, and Q23 and turns off MOS transistors Qp2, Q11, Q13, Q21, and Q22.

Therefore, as illustrated in FIG. 17, a fifth series circuit is formed between the first power supply line L1 and the ground line L0. MOS transistors Qp and Q23, actuator Z1, and MOS transistor Q12 are series-connected in the fifth series circuit.

The first power supply line L1 has potential E/2 (V). The ground line L0 has potential 0 (V). Accordingly, a charge Q output from the first DC power supply 1 is supplied to actuator Z1 through MOS transistor Q23. Actuator Z1 is charged by DC voltage E/2.

A fourth sequence mode M4 further charges actuator Z1. The switch controller 31 turns on MOS transistors Qp, Qn, Q11, and Q23 and turns off MOS transistors Qp2, Q12, Q13, Q21, and Q22.

Figure 18:
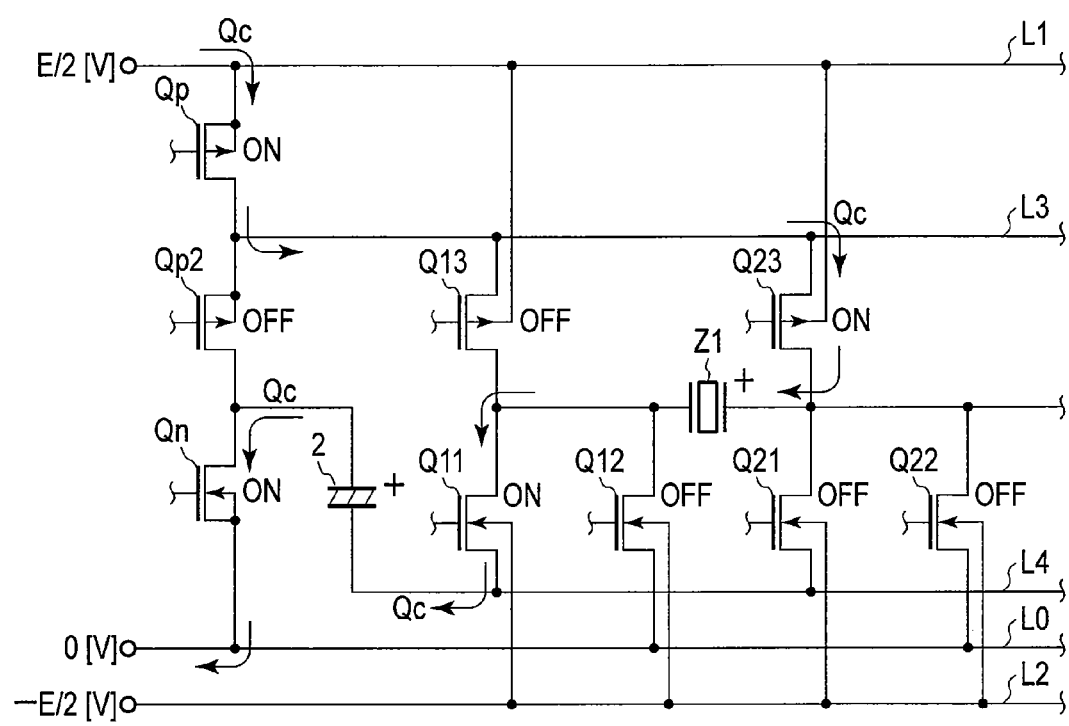
FIG. 18 is a view illustrating an operation pattern of the driving device of the third embodiment in performing the fourth sequence mode.

Therefore, as illustrated in FIG. 18, a sixth series circuit is formed between the first power supply line L1 and the ground line L0. MOS transistors Qp and Q23, actuator Z1, MOS transistor Q11, the capacitor 2, and MOS transistor Qn are series-connected in the sixth series circuit.

Therefore, the potential at the negative electrode of actuator Z1 is decreased from 0 to potential −E/2 at the negative electrode of the capacitor 2. Accordingly, a charge Qc output from the first DC power supply 1 is supplied to actuator Z1 through MOS transistor Q23.

At the same time, a charge Qc is emitted from the capacitor 2 charged by DC voltage E/2. Charge Qc is supplied to the first DC power supply 1 through MOS transistor Qn. Accordingly, actuator Z1 is charged by voltage E which is double the DC voltage of E/2 of the first DC power supply 1.

A fifth sequence mode M5 is performed immediately before actuator Z1 is discharged, for example, 1 μs before. The switch controller 31 turns on MOS transistors Qp2 and Q11 and turns off MOS transistors Qp, Qn, Q12, Q13, Q21, Q22, and Q23.

Figure 19:
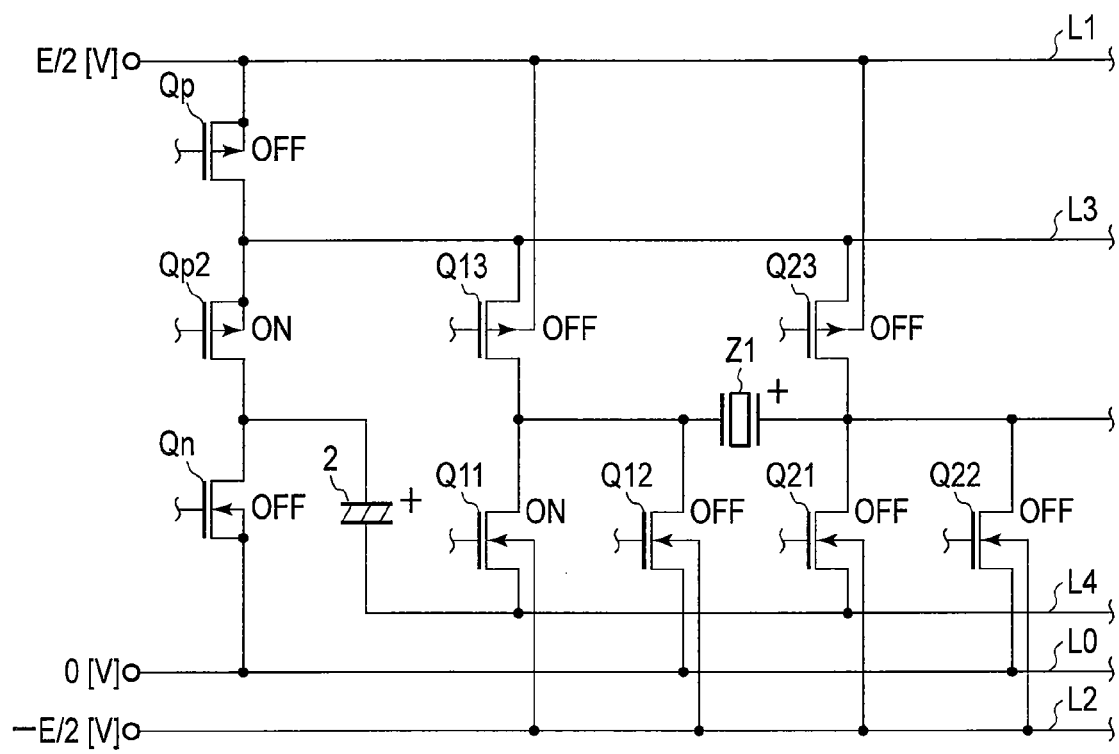
FIG. 19 is a view illustrating an operation pattern of the driving device of the third embodiment in performing a fifth sequence mode.

As illustrated in FIG. 19, the third power supply line L3 is connected to the capacitor 2 through MOS transistor Qp2. The circuit including MOS transistor Qp2, the capacitor 2, MOS transistor Q11, and the negative electrode of actuator Z1 constitutes a floating circuit. As a result, the potential at the third power supply line L3 starts to decreased from E/2 (V).

A sixth sequence mode M6 discharges actuator Z1. The switch controller 31 turns on MOS transistors Qp2, Q11, and Q23 and turns off MOS transistors Qp, Qn, Q12, Q13, Q21, and Q22.

Figure 20:
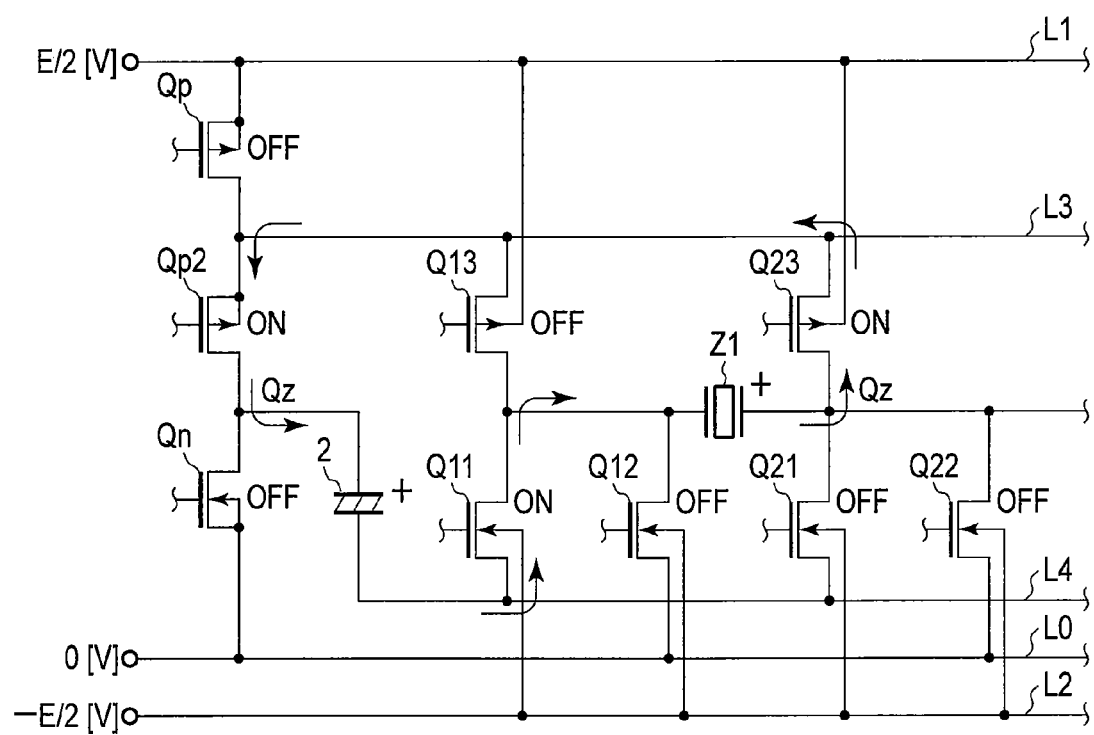
FIG. 20 is a view illustrating an operation pattern of the driving device of the third embodiment in performing a sixth sequence mode.

Therefore, a twelfth closed circuit is formed as illustrated in FIG. 20. The twelfth closed circuit connects the positive electrode and the negative electrode of actuator Z1 through MOS transistors Q23 and Qp2, the capacitor 2, and MOS transistor Q11.

The capacitor 2 had been charged by voltage E/2. A charge Qz is emitted from actuator Z1 which had been charged by DC voltage E.

The capacitance of the capacitor 2 is sufficiently larger than the sum of the capacitances of the actuators that can simultaneously be driven in actuators Z1, Z2, Z3, . . . . Therefore, even if charges Qc and Qz are emitted or fed back, the charge voltage of the capacitor 2 in the third or fourth sequence mode M3 or M4 is substantially maintained at voltage E/2. So, Actuator Z1 is discharged down to voltage E/2 (V).

Charge Qz emitted from actuator Z1 is fed back to the capacitor 2. Charge Qz fed back to the capacitor 2 is equal to charge Qc that is emitted from the capacitor 2 in the last fourth sequence mode M4.

A seventh sequence mode M7 further discharges actuator Z1. The switch controller 31 turns on MOS transistors Qp2, Q11, Q12, Q21, and Q22 and turns off MOS transistors Qp, Qn, Q13, and Q23.

Therefore, thirteenth and fourteenth closed circuits are formed as illustrated in FIG. 21. The thirteenth closed circuit connects the positive electrode and the negative electrode of actuator Z1 through MOS transistors Q21 and Q11. The fourteenth closed circuit connects the positive electrode and the negative electrode of actuator Z1 through MOS transistors Q22 and Q12.

Accordingly, the charge is further emitted from actuator Z1. Actuator Z1 is discharged down to voltage 0 (V). At this point, the fourth power supply line L4 becomes the same potential as the ground line L0, namely, 0. Accordingly, the potential at the third power supply line L3 connected to the capacitor 2 through MOS transistor Qp2 becomes E/2 (V), which is the charged voltage of the capacitor 2.

MOS transistors Qp, Qp2, Qn, Q11, Q12, Q13, Q21, Q22, and Q23 are turned on and off according to the series of charging or discharging sequences of the first to seventh sequence modes M1, M2, M3, M4, M5, M6, and M7. Accordingly, actuator Z1 is charged or discharged.

In the third embodiment, charge Qs by which the capacitor 2 is charged in the first sequence mode M1 becomes smaller as the voltage of capacitor 2 just before the first sequence becomes closer to E/2 (V).

The driving device 300 returns to the first sequence mode M1 after the discharge is ended in the seventh sequence mode M7. In the driving device 300, the first sequence mode M1 is set to the steady state. Therefore, the charge voltage of the capacitor 2 is steadily maintained at E/2. As a result, charge Qs substantially becomes zero except the power-on state.

In the third embodiment, charge Qc that is emitted from the capacitor 2 in the fourth sequence mode M4 is equal to charge Qz that is fed back to the capacitor 2 in the sixth sequence mode M6. Accordingly, the power is not take out of the second voltage source. Therefore, it is not necessary to provide a circuit that supplies the power to the capacitor 2 of the second voltage source.

Additionally, the DC power supply 1 of the first voltage source may output voltage E/2 that is half the maximum voltage E necessary for actuators Z1, Z2, Z3, . . . . Accordingly, the power consumption of the driving device 300 is reduced to a substantial half of the driving device that is charged once to E.

Accordingly, the same effect as the first embodiment is obtained.

Fourth Embodiment

A fourth embodiment will be described with reference to FIGS. 22 to 29.

FIG. 22 is a circuit diagram of a driving device 400 of the fourth embodiment, and only the circuit elements necessary to drive actuator Z1 are illustrated in FIG. 22 for the same reason as the second embodiment. The component in common with that of FIG. 13 is designated by the same numeral.

As illustrated in FIG. 22, the driving device 400 includes a variable switching power supply 41, a DC power supply 42, a first capacitor 43, a second capacitor 44, an operational amplifier 45, resistors R1, R2, and R3, N-type channel MOS transistors Q11, Q12, Q21, and Q22, P-type channel MOS transistors Q13 and Q23, and a switch controller 46.

The switch controller 46 switches between the turn-on and the turn-off of each of MOS transistors Q11, Q12, Q13, Q21, Q22, and Q23. The variable switching power supply 41 outputs variable voltage VA/2. The DC power supply 42 outputs a DC voltage that is larger than the maximum value of the variable voltage VA/2, for example, +24 V.

In the fourth embodiment, the capacitances of actuators Z1, Z2, Z3, . . . are substantially equal to one another. The capacitances of the first and second capacitors 43 and 44 are sufficiently larger than the sum of the capacitances of the actuators that can simultaneously be driven in actuators Z1, Z2, Z3, . . . .

The driving device 400 includes first to third power supply lines L1, L2, and L3 and a ground line L0 of 0 V.

The first power supply line L1 is connected to the positive electrode of the variable switching power supply 41. The second power supply line L2 is connected to the negative electrode of the DC power supply 42. The positive electrode of the DC power supply 42 is connected to the negative electrode of the variable switching power supply 41. The ground line L0 is connected to the connection point of the positive electrode of the DC power supply 42 and the negative electrode of the variable switching power supply 41. Accordingly, the second power supply line L2 is fixed to potential −24 V.

The first capacitor 43 is connected between the first power supply line L1 and the ground line L0. The second capacitor 44 is connected between the ground line L0 and the third power supply line L3.

In the operational amplifier 45, a negative input terminal is connected to the third power supply line L1 through the resistor R1, and a positive input terminal is connected to the ground line L0. An output terminal of the operational amplifier 45 is connected to the connection point of the resistors R1 and the positive input terminal of the operational amplifier 45 through the resistor R2. The connection point of the output terminal of the operational amplifier 45 and the resistor R2 is connected to the power supply line L3 through the resistor R3. A negative power supply of the operational amplifier 45 is connected to the second power supply line L2, and a positive power supply is connected to a low voltage power supply Vcc (for example, +5 V).

In the driving device 400, a series circuit of MOS transistors Q13 and Q11 and a series circuit of MOS transistors Q23 and Q21 are parallel-connected between the first power supply line L1 and the ground line L0.

In the series circuit of MOS transistors Q13 and Q11, the drain electrodes of MOS transistors Q13 and Q11 are connected to each other. The source electrode of MOS transistor Q13 is connected to the first power supply line L1. The source electrode of MOS transistor Q11 is connected to the ground line L0.

In the series circuit of MOS transistors Q23 and Q21, the drain electrodes of MOS transistors Q23 and Q21 are connected to each other. The source electrode of MOS transistor Q23 is connected to the first power supply line L1. The source electrode of MOS transistor Q21 is connected to the ground line L0.

In the driving device 400, the drain electrode of MOS transistor Q12 is connected to the connection point of the drain electrodes of MOS transistors Q13 and Q11. The source electrode of MOS transistor Q12 is connected to the third power supply line L3.

In the driving device 400, the drain electrode of MOS transistor Q22 is connected to the connection point of the drain electrodes of MOS transistors Q23 and Q21. The source electrode of MOS transistor Q22 is connected to the third power supply line L3.

In the driving device 400, the capacitance-type actuator Z1 is connected between the connection point of the drain electrodes of MOS transistors Q11, Q12, and Q13 and the connection point of the drain electrodes of MOS transistors Q21, Q22, and Q23.

The back gates of the N-type channel MOS transistors Q11, Q12, Q21, and Q22 are connected to the second power supply line L2 having potential −24 V. The back gates of the P-type channel MOS transistors Q13 and Q23 are connected to the first power supply line L1.

The variable switching power supply 41 outputs the first voltage to charge actuator Z1 (the first voltage source). The first capacitor 43 constitutes a buffer of the first voltage source. The second capacitor 44 outputs the second voltage to charge actuator Z1 (the second voltage source).

A circuit 47 including MOS transistors Q11, Q12, Q13, Q21, Q22, and Q23 is a charging or discharging individual current-carrying path with respect to actuators Z1, Z2, Z3, . . ., though in FIG. 22, only the actuator Z1 is illustrated.

A circuit including the operational amplifier 45 and the resistors R1, R2, and R3 is a voltage adjusting circuit 48 that adjusts the voltage of the second capacitor 44. The voltage adjusting circuit 48 is what is called a linear regulator that charges the second capacitor 44 from the voltage at the second power supply line L2.

The voltage adjusting circuit 48 of this embodiment is a tracking type linear regulator that tracks a reverse polarity of a positive potential voltage of the first power supply line L1. Alternatively, it may be a variable output linear regulator but is not a tracking type. But it is better to select tracking type linear regulator because of the simplicity. The tracking type regulator is especially suitable when variable control of the driving voltage is performed because of its tracking function.

The resistor R1 is equal to the resistor R2 in a resistance value. Accordingly, feedback works such that the output of the operational amplifier 45 becomes voltage −VA/2 that is equal to the reverse polarity of positive voltage VA/2 applied to the first power supply line L1. The resistor R3 suppresses an output current of the operational amplifier 45 such that a tracking speed is not enhanced beyond necessity. When the tracking speed is enhanced, unnecessary power is consumed.

Accordingly, the third power supply line L3 connected to the negative electrode side of the second capacitor 44 becomes potential −VA/2 that tracks the reverse polarity of potential VA/2 at the first power supply line L1.

The gates of MOS transistors Q11, Q12, Q13, Q21, Q22, and Q23 are connected to the switch controller 46. The switch controller 46 switches between the turn-on and the turn-off of each of MOS transistors Q11, Q12, Q13, Q21, Q22, and Q23 according to a data table 40 of FIG. 23. The switch controller 46 includes a logic circuit. The switch controller 46 may include a microcomputer.

In the driving device 400, the turn-on and the turn-off of each of MOS transistors Q11, Q12, Q13, Q21, Q22, and Q23 perform a series of charging or discharging sequences to actuator Z1.

A first sequence mode M1 is a waiting state before actuator Z1 is charged. The switch controller 46 turns on MOS transistors Q11 and Q21 and turns off MOS transistors Q12, Q13, Q22, and Q23.

Figures 23, 24:
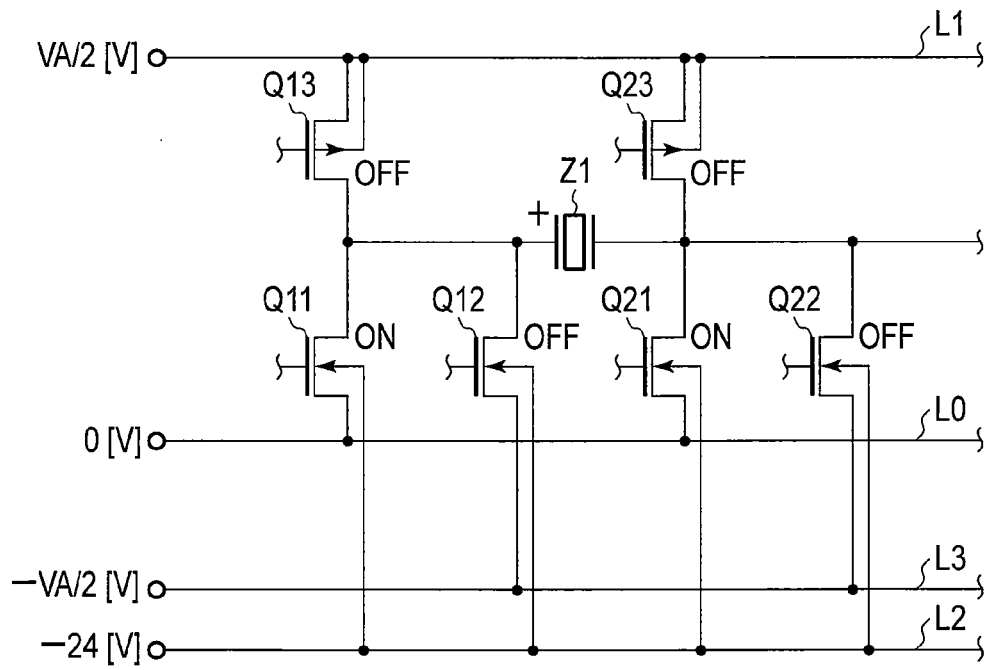
FIG. 23 is a view illustrating a data table used by a switch controller of the fourth embodiment.
FIG. 24 is a view illustrating an operation pattern of the driving device of the fourth and fifth embodiments in performing the first sequence mode.

Therefore, as illustrated in FIG. 24, one of the electrodes of actuator Z1 is connected to the ground line L0 through MOS transistor Q21. Similarly the other electrode of actuator Z1 is connected to the ground line L0 through MOS transistor Q11. Accordingly, in actuator Z1, the potentials at both ends become 0 V. At this point, the charge voltage of actuator Z1 is 0 (V).

A second sequence mode M2 is performed immediately before the charging of actuator Z1 is started, for example, 1 µs before. The switch controller 46 turns on MOS transistors Q13 and Q23 and turns off MOS transistors Q11, Q12, Q21, and Q22.

Therefore, as illustrated in FIG. 25, one of the electrodes of actuator Z1 is connected to the first power supply line L1 through MOS transistor Q23. The other electrode of actuator Z1 is connected to the first power supply line L1 through MOS transistor Q13. Accordingly, in actuator Z1, the potentials at both ends become VA/2. At this point, the charge voltage of actuator Z1 is still at 0 (V), and actuator Z1 is not actuated.

A third sequence mode M3 charges actuator Z1. The switch controller 46 turns on MOS transistors Q13 and Q21 and turns off MOS transistors Q11, Q12, Q22, and Q23.

Therefore, as illustrated in FIG. 26, a seventh series circuit is formed between the first power supply line L1 and the ground line L0. MOS transistor Q13, actuator Z1, and MOS transistor Q21 are series-connected in the seventh series circuit.

Therefore, the electrode on the side to which MOS transistor Q13 of actuator Z1 is connected becomes equal to potential VA/2 (V) at the first power supply line L1, and the electrode on the side to which MOS transistor Q21 is connected becomes potential 0 (V). Accordingly, a charge Q flows into actuator Z1 from the capacitor 43. As a result, actuator Z1 is charged to voltage VA/2.

A fourth sequence mode M4 further charges actuator Z1. The switch controller 46 turns on MOS transistors Q13 and Q22 and turns off MOS transistors Q11, Q12, Q21, and Q23.

Figure 27:
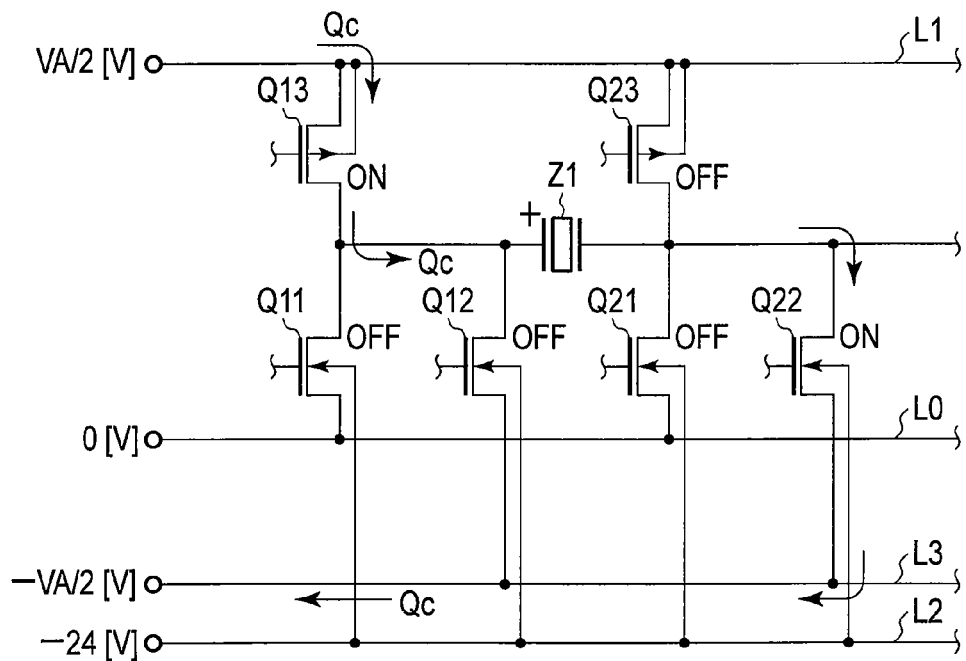
FIG. 27 is a view illustrating an operation pattern of the driving device of the fourth embodiment in performing the fourth sequence mode.

Therefore, as illustrated in FIG. 27, an eighth series circuit is formed between the first power supply line L1 and the third power supply line L3. MOS transistor Q13, actuator Z1, and MOS transistor Q22 are series-connected in the eighth series circuit.

Therefore, the electrode on the side to which MOS transistor Q13 of actuator Z1 is connected is equal to potential VA/2 (V) at the first power supply line L1, and the electrode on the side to which MOS transistor Q22 is connected becomes potential −VA/2 (V) at the third power supply line L3. Accordingly, a charge Qc flows into actuator Z1 from the capacitor 43. Charge Qc flows into the negative electrode of the capacitor 43 from the positive electrode of the capacitor 44. As a result, actuator Z1 is charged to voltage VA which is double the voltage of VA/2.

A fifth sequence mode M5 discharges actuator Z1. The switch controller 46 turns on MOS transistors Q11 and Q22 and turns off MOS transistors Q12, Q13, Q21, and Q23.

Figure 28:
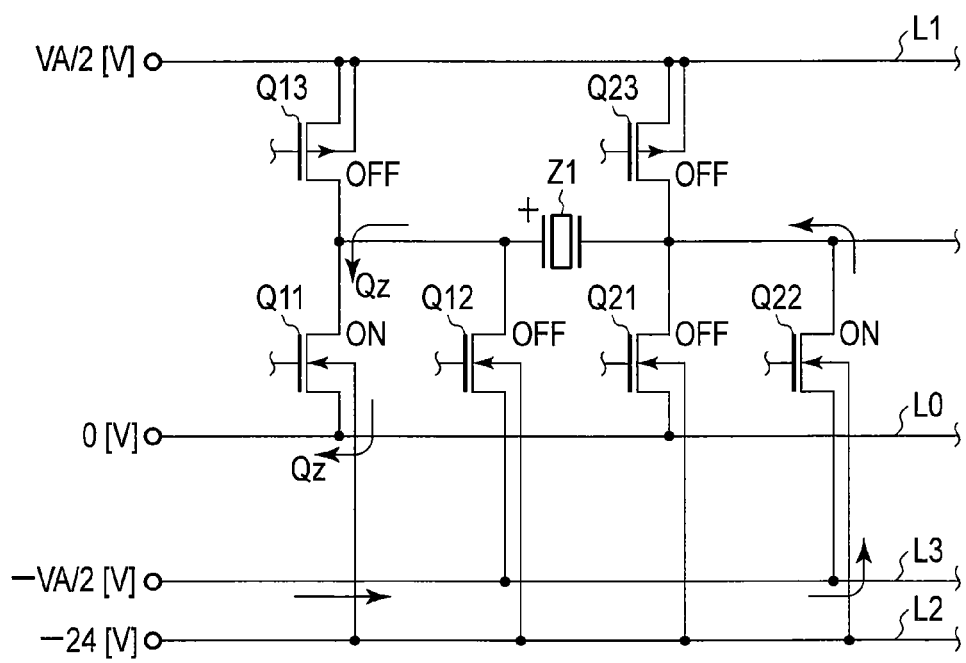
FIG. 28 is a view illustrating an operation pattern of the driving device of the fourth embodiment in performing the fifth sequence mode.

Therefore, as illustrated in FIG. 28, a ninth series circuit is formed between the ground line L0 and the third power supply line L3. MOS transistor Q11, actuator Z1, and MOS transistor Q22 are series-connected in the ninth series circuit.

The second capacitor 44 had been charged by voltage VA/2. Charge Qz is emitted from actuator Z1 which had been charged by voltage VA. Then actuator Z1 down to discharged to voltage VA/2.

Charge Qz emitted from actuator Z1 is fed back to the second capacitor 44 through MOS transistor Q11.

The capacitances of the capacitors 43 and 44 are sufficiently larger than the sum of the capacitances of the actuators that can simultaneously be driven in actuators Z1, Z2, Z3, . . . . Therefore, even if charges Q, Qc, and Qz are emitted, the charge voltages of the capacitors 43 and 44 are substantially maintained at voltage VA/2. So, charge Qz fed back to the second capacitor 44 is equal to charge Qc that is emitted from the second capacitor 44 in the last fourth sequence mode M4.

A sixth sequence mode M6 further discharges actuator Z1. The switch controller 46 turns on MOS transistors Q11 and Q21 and turns off MOS transistors Q12, Q13, Q22, and Q23.

Figures 29, 30:
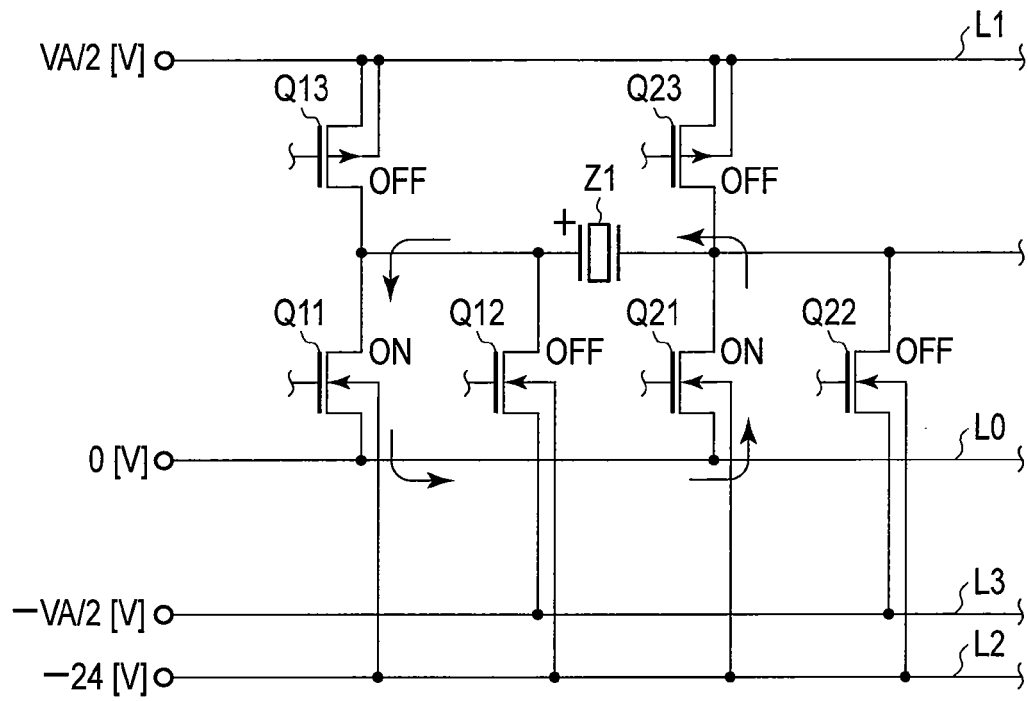
FIG. 29 is a view illustrating an operation pattern of the driving device of the fourth embodiment in performing the sixth sequence mode.
FIG. 30 is a view illustrating a data table used by a switch controller of the fifth embodiment.

Therefore, a fifteenth closed circuit is formed as illustrated in FIG. 29. The fifteenth closed circuit connects the electrodes of actuator Z1 through MOS transistors Q11 and Q21. Accordingly, the charge is further emitted from actuator Z1, and actuator Z1 is discharged until the voltage becomes 0 (V).

MOS transistors Q11, Q12, Q13, Q21, Q22, and Q23 are turned on and off according to the series of charging or discharging sequences of the first to sixth sequence modes M1, M2, M3, M4, M5, and M6. Therefore, actuator Z1 is charged or discharged.

In the fourth embodiment, voltage change for the actuator Z1 between each sequence steps M2→M3, M3→M4, M4→M5, and M5→M6 are all VA/2 (V), so Q=Qc=Qz. Accordingly the first capacitor 43 lacks charge 2Q through all the sequences. The deficit of charge 2Q is supplied from the positive electrode of the variable switching power supply 41. Consumption energy relating to one series of sequence of the driving device 400 is obtained by multiplying the deficit of charge 2Q by the output voltage VA/2 of the variable switching power supply 41.

On the other hand, charge Q (=Qc) is emitted from the positive electrode of the second capacitor 44 in the fourth sequence mode M4, and the same charge Q (=Qz) is fed back to the second capacitor 44 in the fifth sequence mode M5. The charge that flows into and out from the second capacitor 44 becomes zero through the whole sequence.

In the driving device 400, it is necessary to charge the second capacitor 44 with a relatively large charge only in the first time after the power-on. Generally a certain level of waiting time is allowable just after the power-on. Therefore, there is no problem to wait for the voltage adjusting circuit 48 to charge the second capacitor 44 to voltage VA/2.

In the fourth embodiment, charge Qc that is emitted from the second capacitor 44 in the fourth sequence mode M4 is equal to charge Qz that is fed back to the second capacitor 44 in the fifth sequence mode M5. Additionally, the variable switching power supply 41 may output voltage VA/2 that is half maximum voltage VA necessary for actuator Z1. Accordingly, the same effect as the first embodiment is obtained.

The DC power supply 42 has no relation with the driving power of actuator Z1. The power consumption of the DC power supply 42 is significantly smaller than the power for driving the actuator.

Fifth Embodiment

A fifth embodiment will be described with reference to additional FIGS. 30 to 34.

In the fourth embodiment, the electrode on the side to which MOS transistor Q13 of actuator Z1 is connected is equal to the potential VA/2 at the first power supply line L1 in the third sequence mode M3 (FIG. 26). Accordingly, actuator Z1 is charged by voltage VA/2.

In the fifth embodiment, contrary to the fourth embodiment, the electrode on the opposite side to an actuator Z1 is set to the positive electrode so as to be equal to potential VA/2 at a first power supply line L1. Actuator Z1 is also discharged by voltage VA/2.

A driving device of the fifth embodiment is identical to the driving device 400 of the fourth embodiment except for the sequence control. Thereby, FIG. 22 and its explanation in the forth embodiment is substituted for the description of the configuration of the driving device of the fifth embodiment.

In the case in which the charge direction of actuator Z1 is inverted, the method for driving each ink channel of the individual current-carrying path may simply be replaced as described in the first embodiment. However, in the fifth embodiment, another method for inverting the charge direction will be described.

In the fifth embodiment, a switch controller 46 switches between the turn-on and the turn-off of each of MOS transistors Q11, Q12, Q13, Q21, Q22, and Q23 according to a data table 50 of FIG. 30. Thereby, the driving device 400 performs a series of charging or discharging sequences to actuator Z1.

A first sequence mode M1 is a waiting state before actuator Z1 is charged. The switch controller 46 turns on MOS transistors Q11 and Q21 and turns off MOS transistors Q12, Q13, Q22, and Q23. The first sequence mode M1 of the fifth embodiment is identical to the first sequence mode M1 of the fourth embodiment.

Thereby, as illustrated in FIG. 24, one of the electrodes of actuator Z1 is connected to a ground line L0 through MOS transistor Q21. Similarly the other electrode of actuator Z1 is connected to the ground line L0 through MOS transistor Q11. Accordingly, in actuator Z1, the potentials at both ends are 0 (V). Thereby charged voltage of the actuator Z1 is 0 (V).

A second sequence mode M2 charges actuator Z1. The switch controller 46 turns on MOS transistors Q11 and Q23 and turns off MOS transistors Q12, Q13, Q21, and Q22.

Figure 31:
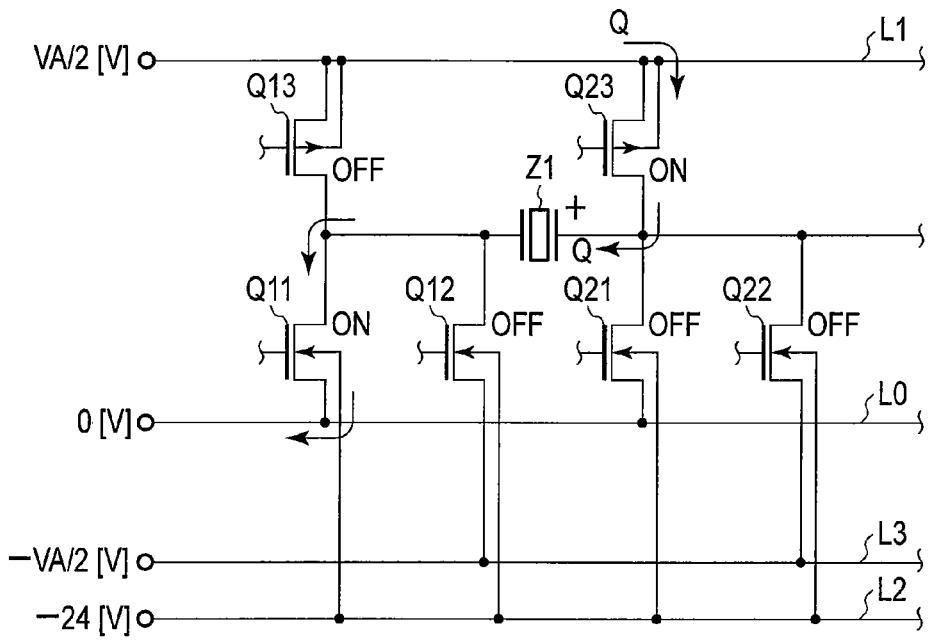
FIG. 31 is a view illustrating an operation pattern of the driving device of the fifth embodiment in performing the second sequence mode.

Thereby, as illustrated in FIG. 31, a tenth series circuit is formed between the first power supply line L1 and the ground line L0. MOS transistor Q23, actuator Z1, and MOS transistor Q11 are series-connected in the tenth series circuit.

Thereby, the electrode on the side to which MOS transistor Q23 of actuator Z1 is connected becomes equal to potential VA/2 at the first power supply line L1, and the electrode on the side to which MOS transistor Q11 is connected becomes potential 0 (V). Accordingly, a charge Q flows into actuator Z1 from a capacitor 43. As a result, actuator Z1 is charged to voltage VA/2.

A third sequence mode M3 further charges actuator Z1. The switch controller 46 turns on MOS transistors Q12 and Q23 and turns off MOS transistors Q11, Q13, Q21, and Q22.

Figure 32:
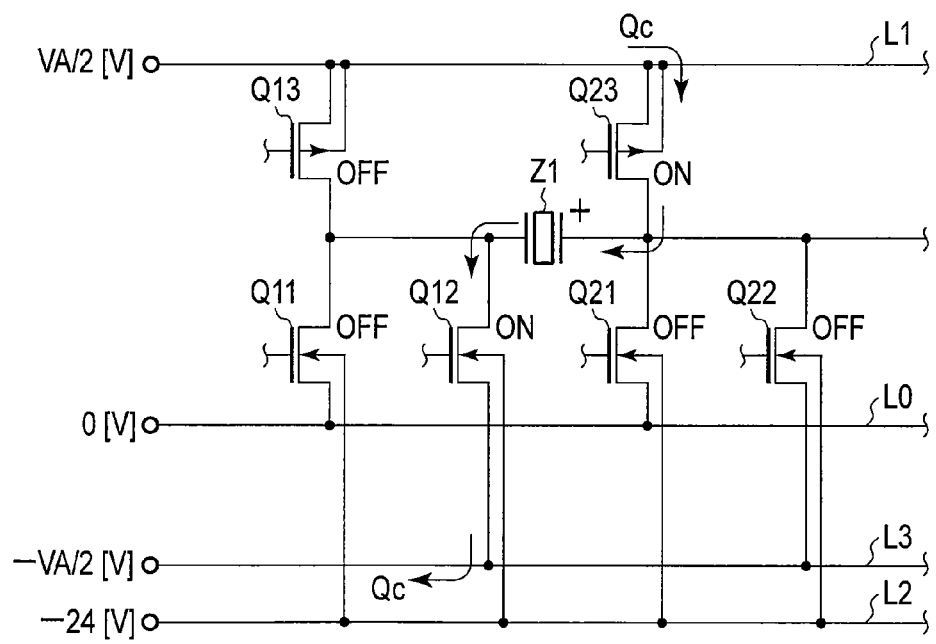
FIG. 32 is a view illustrating an operation pattern of the driving device of the fifth embodiment in performing the third sequence mode.

Thereby, as illustrated in FIG. 32, an eleventh series circuit is formed between the first power supply line L1 and a third power supply line L3. MOS transistor Q23, actuator Z1, and MOS transistor Q12 are series-connected in the eleventh series circuit.

Thereby, the electrode on the side to which MOS transistor Q23 of actuator Z1 is connected becomes equal to potential VA/2 at the first power supply line L1, and the electrode on the side to which MOS transistor Q12 is connected becomes potential −VA/2 at the third power supply line L3. Accordingly, a charge Qc flows into actuator Z1 from the capacitor 43. As a result, actuator Z1 is charged to voltage VA which is double the voltage of VA/2. At this point, charge Qc flows into the negative electrode of the first capacitor 43 from a positive electrode of a second capacitor 44.

A fourth sequence mode M4 discharges actuator Z1. The switch controller 46 turns on MOS transistors Q12 and Q21 and turns off MOS transistors Q11, Q13, Q22, and Q23.

Figure 33:
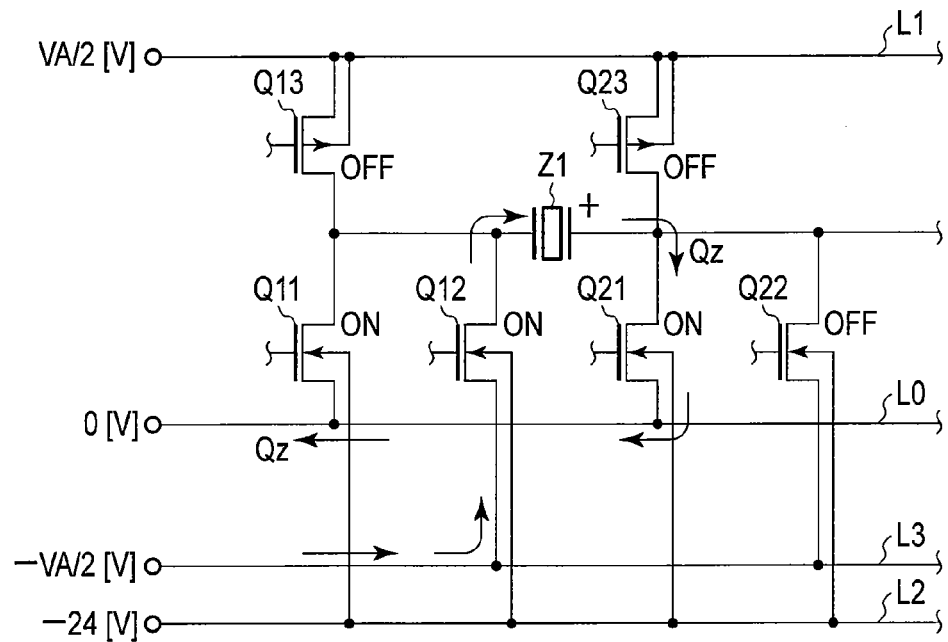
FIG. 33 is a view illustrating an operation pattern of the driving device of the fifth embodiment in performing the fourth sequence mode.

Thereby, as illustrated in FIG. 33, a twelfth series circuit is formed between the ground line L0 and the third power supply line L3. MOS transistor Q12, actuator Z1, and MOS transistor Q21 are series-connected in the twelfth series circuit.

The second capacitor 44 between the ground line L0 and the third power supply line L3 is charged. Accordingly, a charge Qz is emitted from actuator Z1 which had been charged by voltage VA. Then actuator Z1 is discharged to voltage VA/2.

Charge Qz emitted from actuator Z1 is fed back to the second capacitor 44 through MOS transistor Q21.

The capacitances of the capacitors 43 and 44 are sufficiently larger than the sum of the capacitances of the actuators that can simultaneously be driven in actuators Z1, Z2, Z3, . . . . Therefore, even if charges Q, Qc, and Qz are emitted or fed back, the charge voltages of the capacitors 43 and 44 are substantially maintained at voltage VA/2. Therefore, charge Qz fed back to the second capacitor 44 is equal to the charge Qc that is emitted from the second capacitor 44 in the last third sequence mode M3.

A fifth sequence mode M5 further discharges actuator Z1. The switch controller 46 turns on MOS transistors Q11 and Q21 and turns off MOS transistors Q12, Q13, Q22, and Q23.

Figure 34:
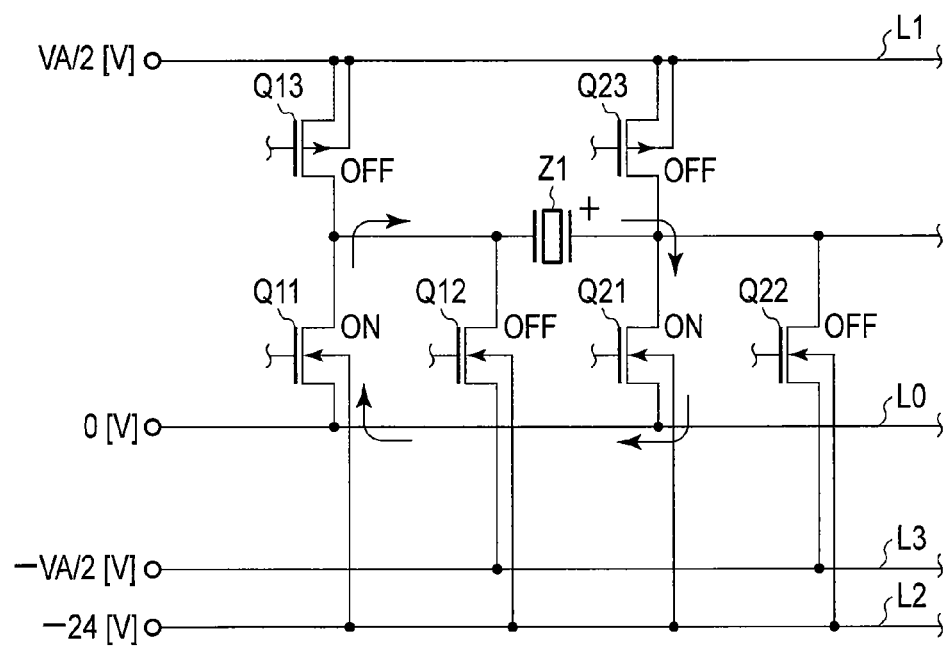
FIG. 34 is a view illustrating an operation pattern of the driving device of the fifth embodiment in performing the fifth sequence mode.

Thereby, a sixteenth closed circuit is formed as illustrated in FIG. 34. The sixteenth closed circuit connects each electrode of actuator Z1 through MOS transistors Q21 and Q11.

Accordingly, the charge is further emitted from actuator Z1. Actuator Z1 is discharged to voltage 0 V.

Thus MOS transistors Q11, Q12, Q13, Q21, Q22, and Q23 are turned on and off according to the series of charging or discharging sequences of the first to fifth sequence modes M1, M2, M3, M4, and M5. Thereby, actuator Z1 is charged or discharged.

In the fifth embodiment, voltage change for the actuator Z1 between each sequence steps M2→M3, M3→M4, M4→M5, and M5→M6 are all VA/2 (V), so Q=Qc=Qz. Accordingly the first capacitor 43 lacks charge 2Q through all the sequences. The deficit of charge 2Q is supplied from the positive electrode of the variable switching power supply 41. Consumption energy relating to one series of sequence of the driving device 400 is obtained by multiplying the deficit of charge 2Q by the output voltage VA/2 of the variable switching power supply 41.

On the other hand, charge Q (=Qc) is emitted from the positive electrode of the second capacitor 44 in the third sequence mode M3, and the same charge Q (=Qz) is fed back to the second capacitor 44 in the fourth sequence mode M4. The charge that flows into and out from the second capacitor 44 becomes zero through the whole sequence.

In the driving device 400, it is necessary to charge the second capacitor 44 with a relatively large charge only in the first time after the power-on. Generally a certain level of waiting time is allowable just after the power-on. Therefore, there is no problem to wait for the voltage adjusting circuit 48 to charge the second capacitor 44 to voltage VA/2.

In the fifth embodiment, respective modes of M1 through M5 are controlled so that charge Qc that is emitted from the second capacitor 44 in the third sequence mode M3 is equal to charge Qz that is fed back to the second capacitor 44 in the fourth sequence mode M4. This control system causes the second voltage source not to consume the electric power. Therefore, the capacitor 44, i.e., the second voltage source, is not needed to supply the electric power. Thus, even if a small power linear regulator, i.e., a voltage adjusting circuit 48 which is composed of a small power operational amplifier 45 and resistances R1, R2, and R3, is applied to the control system, a voltage potential of the power supply line L3 can be sufficiently stabilized. Additionally, the variable switching power supply 41 may output voltage VA/2 that is half maximum voltage VA necessary for actuator Z1. Accordingly, the same effect as the first embodiment is obtained.

The DC power supply 42 has no relation with the driving power of actuator Z1. The DC power supply 42 only biases a back-gate of the N-type channel MOS transistors Q11, Q12, Q21, and Q22 and serves as a negative power line for an operational amplifier 45. Therefore, the power consumption of the DC power supply 42 is significantly smaller than the power for driving the actuator.

The same effect as the fourth embodiment is obtained in the fifth embodiment.

In the fifth embodiment, the method for driving each ink channel of the individual current-carrying path may simply be replaced as described in the first embodiment. In such cases, the charging and discharging are performed in the same direction as in the fourth embodiment.

In the actuator for the inkjet head, the proper driving voltage varies according to viscosity of the ink. The viscosity of the ink varies according to a kind of the ink or a temperature of the ink. Characteristics of the actuator also have variations and temperature characteristics. Therefore, from various viewpoints, desirably the driving voltage can be changed to properly drive the actuator.

In the fourth and fifth embodiments, the charge voltage of the capacitor 44 that is of the second voltage source automatically tracks the power supply voltage of the first voltage source. Therefore, advantageously the adjustment can simply be made, and accuracy of the adjustment of the drive voltage for the actuator can be improved.

Other Embodiments

In the fourth and fifth embodiments, the variable switching power supply 41 is used as the first voltage source. The variable switching power supply may be used as the first voltage source 1 in the first, second, and third embodiments.

In the first, second, and third embodiments, the charge voltage of the capacitor 2 that is of the second voltage source is directly charged from the first voltage source. Accordingly, the voltage at the second voltage source tracks the voltage at the first voltage source even if the special control is not performed.

That is, in all the embodiments, the voltage at the second voltage source tracks the voltage at the first voltage source. In the driving device of the embodiments, the voltages at the voltage sources on the positive and negative electrode sides can simultaneously be adjusted by adjusting one driving voltage.

In the fourth and fifth embodiments, the first capacitor 43 is provided as the buffer in parallel to the first voltage source. Alternatively, the first voltage source may have a function of the buffer.

In the first, second, and third embodiments, the buffer is not shown in parallel to the first voltage source. Alternatively, similarly to the fourth and fifth embodiments, the capacitor may be provided as the buffer in parallel to the first voltage source.

In the first embodiment, the inkjet head is the shear-mode, shared-wall type in which the actuator is shared by the adjacent ink channels. In the second to fifth embodiment, the description is focused to charge/discharge function but not very detail of how to eject the ink. But the inkjet head may be either a shared wall type or a non-shared-wall type in which a piezoelectric actuator is not shared by the adjacent ink channels but is provided with each ink channel to eject ink through a nozzle arranged to the each ink channel. In the first to fifth embodiments, either the shared wall type or the non-shared wall type inkjet head can be applied. The embodiments can widely be applied to the actuator that is driven by the charging and discharging.

In all the embodiments, when the operation to drive a terminal of each actuator in the individual driving circuit is replaced with the operation to drive another terminal of each actuator in the individual driving circuit, the charging and discharging can be performed in the opposite direction to that of the embodiments.

Alternatively all the P-type channel transistors may be replaced with the N-type channel transistors while all the N-type channel transistors may be replaced with the P-type channel transistors, and also the polarities of all the power supplies and capacitors may be inverted. Thereby, the charging and discharging may be performed in the opposite direction to that of the embodiments.

Alternatively, the charging and discharging may be performed in the same direction as the embodiments by simultaneously performing both.

In the embodiments, assuming that 400 actuators are simultaneously driven while each actuator has a capacitance of 250 pF, the sum of capacitances maximally becomes 0.1 µF. In this case, it is necessary that the capacitor 2 of the first, second, and third embodiments and the capacitors 43 and 44 of the fourth and fifth embodiments be sufficiently larger than 0.1 µF, so that the capacitor 2 and the capacitors 43 and 44 may be set to 10 µF, which is 100 times the sum of capacitances.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An apparatus for driving a capacitance-type actuator comprising:
    a first voltage source that outputs a first voltage to charge the actuator;
    a second voltage source that outputs a second voltage to charge the actuator;
    a plurality of switches; and
    a switch controller that controls the plurality of switches to charge and discharge the actuator in one of a first charge mode, a second charge mode, a first discharge mode, and a second discharge mode, wherein:
        in the first charge mode, the switch controller controls the plurality of switches to form a charge path connecting the first voltage output from the first voltage source to the actuator,
        in the second charge mode, the switch controller controls the plurality of switches to form a charge path connecting the first voltage output from the first voltage source and the second voltage output from the second voltage source in series, and connecting the series-connected first and second voltage outputs having a total voltage of the first voltage plus the second voltage to the actuator,
        in the first discharge mode, the switch controller controls the plurality of switches to form a discharge path connecting the actuator to the second voltage source, and
        in the second discharge mode, the switch controller controls the plurality of switches to form a discharge path from the actuator, the second discharge path excluding the second voltage source.

2. The apparatus of claim 1, wherein
    a charge output from the second voltage source in the second charge mode is equal to a charge guided to the second voltage source in the first discharge mode.

3. The apparatus of claim 2, wherein
    the second voltage source is a capacitor, and a capacitance of the capacitor is sufficiently larger than a capacitance of the actuator.

4. The apparatus of claim 3, further comprising
    a charge pump circuit that parallel-connects the first voltage source and the capacitor to charge the capacitor and series-connects the first voltage source and the capacitor to output a voltage that is double a voltage output from the first voltage source.

5. The apparatus of claim 3, further comprising a voltage adjusting circuit that adjusts a charge voltage of the capacitor.

6. The apparatus of claim 5, wherein
    the voltage adjusting circuit is a linear regulator that generates a voltage to charge the capacitor from a voltage at a power supply line connected to a negative electrode of a DC power supply.

7. The apparatus of claim 5, wherein
    the voltage adjusting circuit is a tracking regulator that tracks of a reverse polarity of a potential at a power supply line connected to a positive electrode of the first voltage source.

8. The apparatus of claim 1, wherein
    the driver sets a potential at a negative electrode of the actuator to 0 V before the first charge mode is performed.

9. A method for driving a capacitance-type actuator comprising:
    forming a first charge path connecting a first voltage output from a first voltage source to the actuator;
    forming a second charge path connecting the first voltage output from the first voltage source and a second voltage output from a second voltage source in series, and connecting the series-connected first and second voltage outputs having a total voltage of the first voltage plus the second voltage to the actuator;
    forming a first discharge path connecting the actuator to the second voltage output from the second voltage source; and
    forming a second discharge path from the actuator, the second discharge path excluding the second voltage source.

10. The method of claim 9, wherein
    a charge output from the second voltage source when the second charge path is formed is equal to a charge input to the second voltage source when the first discharge path is formed.

11. The method of claim 9, wherein
    the second voltage source is a capacitor, and a capacitance of the capacitor is sufficiently larger than a capacitance of the actuator.

12. The method of claim 11, wherein
    the first voltage source is parallel-connected to the capacitor to charge the capacitor and series-connected to the capacitor to supply a voltage that is double an output voltage to the actuator.

13. The method of claim 11, wherein
    a charge voltage of the capacitor is adjusted by a voltage adjusting circuit.

14. The method of claim 13, wherein
    the voltage adjusting circuit is a linear regulator that generates a voltage to charge the capacitor from a voltage at a power supply line connected to a negative electrode of a DC power supply.

15. The method of claim 13, wherein
    the voltage adjusting circuit is a tracking regulator that tracks of a reverse polarity of a potential at a power supply line connected to a positive electrode of the first voltage source.

16. The method of claim 9, wherein
    the first charge path, the second charge path, the first discharge path and the second discharge path are formed sequentially in that order.

17. The method of claim 16, wherein
a potential at a negative electrode of the actuator is set to 0 V before the first sequence mode is performed.

18. An apparatus for driving a capacitance-type actuator comprising:
a first voltage source that outputs a first voltage,
a second voltage source that outputs a second voltage,
a first switch positioned between a positive terminal of the first voltage source and a first terminal of an actuator circuit that includes the actuator;
a second switch positioned between a first terminal of the second voltage source and the first terminal of actuator circuit;
a third switch positioned between a second terminal of the second voltage source and a second terminal of the first voltage source, the second terminal of the second voltage source connecting to a second terminal of the actuator circuit; and
a fourth switch positioned between the first terminal of the second voltage source and the second terminal of the first voltage source, and
a driver that switches among a first charge mode, a second charge mode, a first discharge mode, and a second discharge mode by controlling each of the first, second, third and fourth switches to be on or off, wherein
in the first charge mode, a first voltage output from the first voltage source is supplied to the actuator circuit,
in the second charge mode, a voltage sum of the first voltage output from the first voltage source plus a second voltage output from the second voltage source is supplied to the actuator circuit,
in the first discharge mode, a charge accumulated in the actuator is discharged and supplied to the second voltage source, and
in the second discharge mode, a charge accumulated in the actuator is discharged without being supplied to the second voltage source.

19. The apparatus of claim 18, wherein:
in the first charge mode, at least the first and third switches are controlled to be on and the fourth switch is controlled to be off.

20. The apparatus of claim 18, wherein
in the second charge mode, the first and fourth switches are controlled to be on and the second and third switches are controlled to be off.

* * * * *